(12) United States Patent
Yodo

(10) Patent No.: US 7,493,275 B1
(45) Date of Patent: Feb. 17, 2009

(54) TERMINAL, CHARGING SYSTEM, AND DATA PROCESSING METHOD

(75) Inventor: Fumitake Yodo, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/600,509

(22) PCT Filed: Nov. 17, 1999

(86) PCT No.: PCT/JP99/06424

§ 371 (c)(1),
(2), (4) Date: Jul. 17, 2000

(87) PCT Pub. No.: WO00/29996

PCT Pub. Date: May 25, 2000

(30) Foreign Application Priority Data

Nov. 17, 1998 (JP) .............................. P10-327019

(51) Int. Cl.
*G06F 17/60* (2006.01)
(52) U.S. Cl. .............................. 705/30; 705/1; 705/73; 713/182
(58) Field of Classification Search ...................... 725/5; 705/30, 1, 73; 713/182
See application file for complete search history.

(56) References Cited

U.S. PATENT DOCUMENTS

| | | | | |
|---|---|---|---|---|
| 4,658,093 | A | * | 4/1987 | Hellman ....................... 705/52 |
| 5,252,775 | A | * | 10/1993 | Urano ......................... 725/105 |
| 5,539,825 | A | * | 7/1996 | Akiyama et al. ............... 705/68 |
| 5,592,511 | A | * | 1/1997 | Schoen et al. ................ 375/220 |
| 5,619,247 | A | * | 4/1997 | Russo ......................... 725/124 |
| 5,636,276 | A | * | 6/1997 | Brugger ....................... 705/54 |
| 5,692,132 | A | | 11/1997 | Hogan ......................... 395/227 |
| 5,734,719 | A | * | 3/1998 | Tsevdos et al. ............... 700/234 |
| 5,767,504 | A | * | 6/1998 | Menconi ....................... 235/492 |
| 5,857,020 | A | * | 1/1999 | Peterson, Jr. .................. 705/52 |
| 5,884,292 | A | * | 3/1999 | Baker et al. .................. 705/403 |
| 5,917,168 | A | * | 6/1999 | Nakamura et al. .......... 235/379 |
| 5,936,221 | A | * | 8/1999 | Corder et al. ................ 235/380 |

(Continued)

FOREIGN PATENT DOCUMENTS

EP 0715244 6/1996

(Continued)

OTHER PUBLICATIONS

Derfler, Frank J. et. al. How Networks Work, Millennium Ed., Que Corporation, Jan. 2000.*

(Continued)

*Primary Examiner*—Andrew J. Fischer
*Assistant Examiner*—John M. Winter
(74) *Attorney, Agent, or Firm*—Lerner, David, Littenberg, Krumholz & Mentlik, LLP

(57) ABSTRACT

This invention relates to a terminal device capable of communicating with an accounting center, an accounting system, and a data processing method. A point memory 45 of a recording/reproducing device 10 stores accounting point information. An HDD 15 stores information distributed from an external source. A CPU 11 updates the accounting point information stored in the point memory 45 and updates attributes of the distributed information when the distributed information is stored onto the HDD 15. Thus, such inconvenience that communication with a distribution/accounting center 1 is carried out every time information is distributed to the recording/reproducing device 10 is avoided.

4 Claims, 15 Drawing Sheets

U.S. PATENT DOCUMENTS

| | | | | | |
|---|---|---|---|---|---|
| 5,959,945 | A | * | 9/1999 | Kleiman | 381/81 |
| 6,062,472 | A | * | 5/2000 | Cheung | 235/380 |
| 6,067,562 | A | * | 5/2000 | Goldman | 709/206 |
| 6,070,795 | A | * | 6/2000 | Feiken | 235/380 |
| 6,085,976 | A | * | 7/2000 | Sehr | 235/384 |
| 6,182,128 | B1 | * | 1/2001 | Kelkar et al. | 709/219 |
| 6,233,682 | B1 | * | 5/2001 | Fritsch | 713/168 |
| 6,247,130 | B1 | * | 6/2001 | Fritsch | 713/171 |
| 6,295,555 | B1 | * | 9/2001 | Goldman | 709/219 |
| 6,304,523 | B1 | * | 10/2001 | Jones et al. | 369/30 |
| 6,434,535 | B1 | * | 8/2002 | Kupka et al. | 705/24 |
| 6,473,500 | B1 | * | 10/2002 | Risafi et al. | 379/144.01 |
| 6,523,011 | B1 | * | 2/2003 | Mihatsch | 705/70 |
| 6,694,387 | B2 | * | 2/2004 | Wagner | 710/33 |
| 6,712,266 | B2 | * | 3/2004 | Bartley et al. | 235/380 |
| 6,745,022 | B2 | * | 6/2004 | Knox | 455/406 |
| 6,786,400 | B1 | * | 9/2004 | Bucci | 235/380 |
| 6,850,996 | B2 | * | 2/2005 | Wagner | 710/33 |
| 2001/0016836 | A1 | * | 8/2001 | Boccon-Gibod et al. | 705/51 |
| 2001/0034705 | A1 | * | 10/2001 | Rhoads et al. | 705/39 |
| 2001/0049728 | A1 | * | 12/2001 | Kang | 709/219 |
| 2002/0002620 | A1 | * | 1/2002 | Ozawa | 709/237 |

FOREIGN PATENT DOCUMENTS

| | | |
|---|---|---|
| EP | 0786774 | 7/1997 |
| EP | 0843449 | 5/1998 |
| JP | 8265189 | 10/1996 |
| JP | 8307558 | 11/1996 |
| JP | 9265371 | 10/1997 |

OTHER PUBLICATIONS

White, Ron, How Computers Work Millennium Ed. Que Corporation, Sep. 1999.*

Gralla, Preston, How the Internet Works, Millennium Ed., Que Corporation, Aug. 1999.*

Muller, Nathan J., Desktop Encyclopedia of the Internet, Artech House, Inc., 1998.*

White, Ron, How Computers Work, 4th edition, Que Corportation, Sep. 18, 1998.*

Danish Patent and Trademark Office International Search Report, Nov. 10, 2005, 15 pages.

Majka, David R., "An electronic tickler file for reference collection management", Library software review, vol. 14 No. 3, p. 146, Fall 1995.

www.fastoll.com available to the public on the Internet May 24, 1998 (found using Internet Archive's Wayback Machine).

"Purchasing cards:where's the data? Corporations are looking for promised level three data", Treasury Managers Report, vol. 3 No. 22, Oct. 27, 1995.

* cited by examiner

| | | |
|---|---|---|
| ALBUM INFORMATION | ·TYPE/NUMBER OF FILE<br>·ALBUM TITLE<br>·DATA SIZE<br>·DATE & TIME INFORMATION<br>·NAMES OF PARTIES CONCERNED<br>·COPYRIGHT INFORMATION | ·ALBUM ID<br>·INFORMATION USE PERMISSION FLAG<br>·OTHERS |
| FILE INFORMATION (#1) | ·TYPE OF FILE<br>·ADDRESS POINTER<br>·DATA SIZE<br>·TITLE (TITLE OF TUNE)<br>·DATE & TIME INFORMATION<br>·NAME OF PARTIES CONCERNED<br>·COPYRIGHT INFORMATION | ·INFORMATION USE PERMISSION FLAG<br>·OTHERS |
| ⋮ | | |
| FILE INFORMATION (#m) | ·TYPE OF FILE<br>·ADDRESS POINTER<br>·DATA SIZE<br>·TITLE (TITLE OF TUNE)<br>·DATE & TIME INFORMATION<br>·NAMES OF PARTIES CONCERNED<br>·COPYRIGHT INFORMATION | ·INFORMATION USE PERMISSION FLAG<br>·OTHERS |
| RELATED FILE INFORMATION | ·TYPE/NUMBER OF FILE<br>·ADDRESS POINTER<br>·DATA SIZE<br>·DATE & TIME INFORMATION<br>·NAMES OF PARTIES CONCERNED | ·COPYRIGHT INFORMATION<br>·INFORMATION USE PERMISSION FLAG<br>·OTHERS |

(The entire structure above is labeled MANAGEMENT FILE)

FIG.6

| NUMBER OF POINTS PT |
| --- |
| R1 (POINT USE RECORD) |
| R2 |
| R3 |
| ⋮ |

FIG.7

POINT PURCHASE MENU

PLEASE SELECT NUMBER OF POINTS
　　　YOU WANT TO PURCHASE

☑　　100 POINTS　[10000YEN]

☐　　 50 POINTS　[ 5000YEN]

☐　　 10 POINTS　[ 1000YEN]

☐　　  5 POINTS　[  500YEN]　　DECIDE　　CANCEL

FIG.12

TERMINAL, CHARGING SYSTEM, AND DATA PROCESSING METHOD

TECHNICAL FIELD

This invention relates to a terminal device, an accounting system and a data processing method, and in particular to an accounting system including an accounting center in an information distribution system and a terminal device that can communicate with the accounting center.

BACKGROUND ART

There are various types of audio-visual equipment owned by users and it has been common that users enjoy music and video software for personal use. For example, some users own an audio system using recording media such as compact discs (CD) or mini discs (MD, trademark) and purchase desired CDs or MDs for playback.

Apart from the system for providing music or the like as a so-called package medium to the user, a system for distributing data such as music to a terminal device of the user is considered.

It is also considered to distribute not music data itself but additional data for the music owned by the user on CD or the like, for example, text data of title, lyrics, message and profile of artist, and related graphic data.

In consideration of a system where information distribution of music and additional information is chargeable, an accounting system capable of collecting an appropriate fee from the user is required.

As the accounting system, there is first considered a system for carrying out accounting through communication between the terminal device and the accounting center every time chargeable information is taken into the terminal device owned by the user. In such a system, for example, in the state where the terminal device and the accounting center are connected with each other via a telephone line or the like, the accounting center carries out accounting with respect to the user in accordance with the information taken into the user terminal device and later draws the fee from the bank account of the user.

However, as the communication between the accounting center and the terminal device is carried out every time information is taken into the user terminal device as described above, the user must wait for the use of information until the accounting processing is completed. Particularly, depending on the degree of congestion and type of line, the user may have to wait for a very long time.

It is also considered to employ a prepaid card as the accounting system. However, there are many disadvantages of this type of system such as the high cost of circulation of the prepaid cards, the troublesome procedure for the user to purchase the card, and the necessity of providing a dedicated card reader in the terminal device of the user.

DISCLOSURE OF THE INVENTION

Thus, it is an object of the present invention to overcome the foregoing problems.

According to the present invention, there is provided a terminal device including: a first memory for storing accounting point information; a second memory for storing information distributed from an external source; and a control section for updating the accounting point information stored in the first memory and updating attributes of the distributed information when the distributed information is stored in the second memory.

According to the present invention, there is also provided an accounting system including: a terminal device including a first memory for storing accounting point information, a second memory for storing information distributed from an external source, and a control section for updating the accounting point information stored in the first memory and updating attributes of the distributed information when the distributed information is stored in the second memory; and an accounting center including an accounting section for carrying out accounting processing in accordance with the accounting point information transmitted from the terminal device.

BRIEF DESCRIPTION OF THE DRAWINGS

FIG. 6 shows specific contents of a management file.

FIG. 7 shows specific contents of a point memory constituting the recording/reproducing device.

FIG. 12 shows a specific screen of a display section constituting the recording/reproducing device.

BEST MODE FOR CARRYING OUT THE INVENTION

The terminal device, the accounting system, and the data processing method according to the present invention are described in detail with reference to the drawings.

Figure 1:
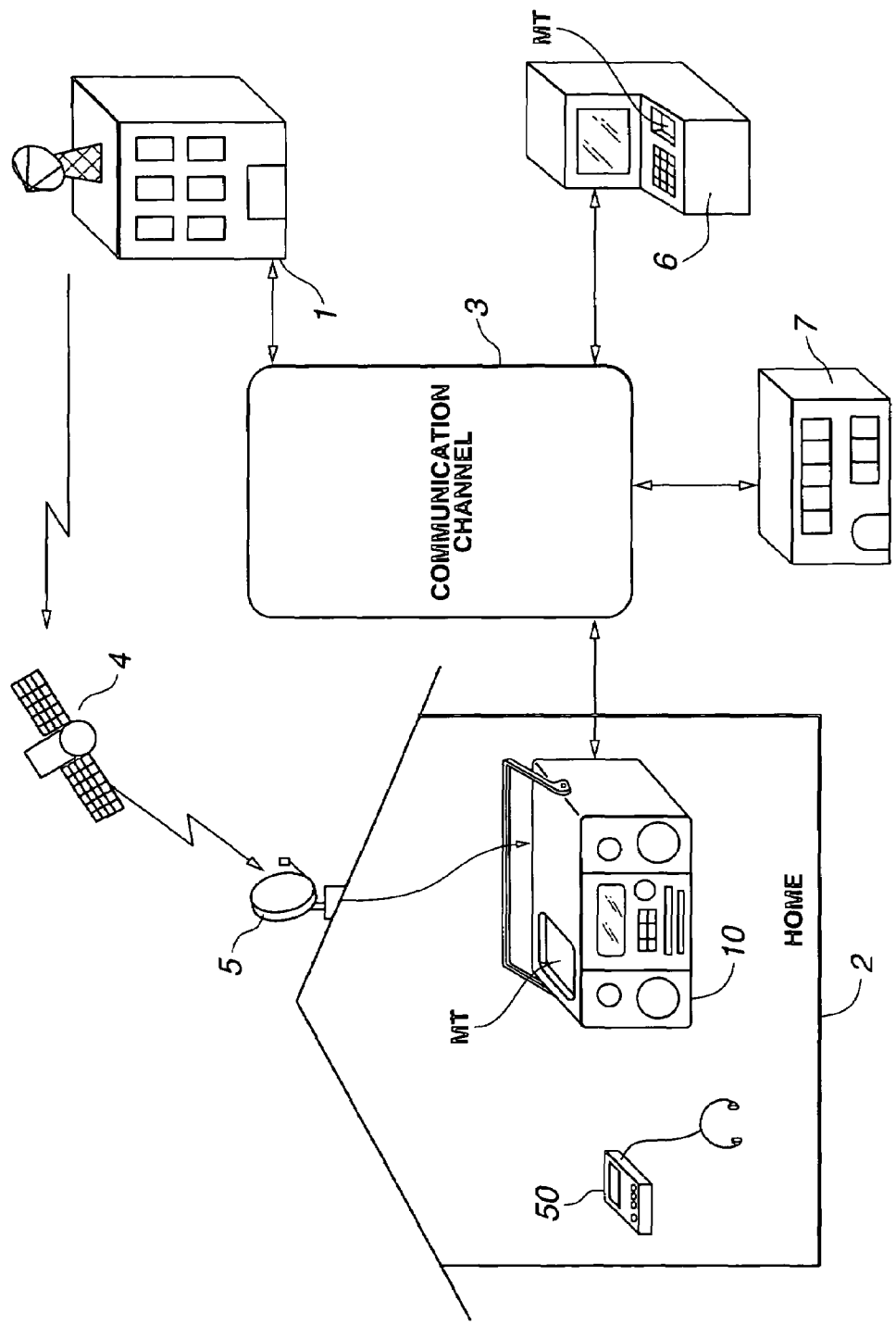
FIG. 1 is a schematic view showing the overview of an information distribution system to which the present invention is applied.

FIG. 1 is a schematic view showing the overview of an information distribution system to which the present invention is applied. This information distribution system is constituted by a recording/reproducing device 10 used by a general user at home 2 or the like, and an information distribution/accounting center such as a distribution/accounting center 1 as an information service institution which provides information to be used in the recording/reproducing device 10.

The distribution/accounting center 1 and the recording/reproducing device 10 communicate various information with each other via a communication channel 3. The communication channel 3 is made of a public line network such as an ISDN line, or a dedicated line network constructed exclusively for that system. The line mode is not particularly limited. Also, the distribution/accounting center 1 and the recording/reproducing device 10 may communicate information with each other via a satellite communication channel made up of a communication satellite 4 and a parabolic antenna 5 installed at each home 2.

The recording/reproducing device 10 used by the general user has a large-capacity data file storage section provided therein, and has the function to drive a so-called package medium such as an optical disc, a magneto-optical disc or a semiconductor memory, the function to input data from other equipment, and the function to input data through the communication channel. In addition, the recording/reproducing device 10 stores various data including audio data and video data reproduced from media purchased by the user such as an optical disc, an optical disc device and a semiconductor memory, or various data inputted from other equipment or the communication channel, to the data file storage section as respective files.

For example, music files such that each tune is stored as one file in the recording/reproducing device 10 are arbitrarily reproduced by the user. Therefore, if the user having a number of optical discs stores in advance each of the tunes of all the optical discs as each file into the recording/reproducing device 10, the user can reproduce a desired tune without selecting and loading an optical disc to the recording/reproducing device 10.

The distribution/accounting center 1 provides various kinds of chargeable or free information to the recording/reproducing device 10. For example, as the information related to the music files or the like stored in the recording/reproducing device 10, text data such as the title of the tune, the name of artist and lyrics, image data such as a tune image and an image of the artist, the uniform resource locator (URL) or address of an Internet home page of the artist, copyright-related information, and the names of parties concerned (lyrics writer, composer, producer, etc.) Are provided. The recording/reproducing device 10 stores such information provided from the distribution/accounting center 1 correspondingly to the tunes and uses the information for various operations such as display onto a display section.

The distribution/accounting center 1 transmits the audio data itself, that is, tunes, to the recording/reproducing device 10. The recording/reproducing device 10 stores the received audio data as files. That is, a sales system for tunes which is different from that for package media like optical discs is constructed.

Moreover, the distribution/accounting center 1 carries out processing for charging the fee to the user with respect to the chargeable information provided to the user. For example, the distribution/accounting center 1 carries out processing for drawing the amount equivalent to the fee of the information provided to the user, from the bank account of the user.

The chargeable information may include related information for tunes as described above and data of the tune itself.

What information is the actually chargeable information provided by the distribution/accounting center 1 is determined by the institution, company or individual person who provides information sales service. It is not a technical element constituting this invention and therefore will not be described further in detail. Meanwhile, a mode for providing a certain chargeable operation function to the recording/reproduction device 10 as well as providing information may also be considered. In such a mode, for example, the distribution/accounting center 1 charges the copyright royalty to the user when the user dubs music data of an optical disc to a magneto-optical disc or a semiconductor memory by using the recording/reproducing device 10.

The essential technique of this specific example consists in the accounting processing. The accounting target is the offer of certain chargeable information. However, if permission of dubbing is chargeable, the dubbing permission information is the offer of chargeable information of this invention.

As a device used by the user, a portable recording/reproducing device which can be connected to the recording/reproducing device 10, that is, a portable device 50, may be employed. The portable device 50 has a data file storage section provided therein for storing files of audio data and the like. When the portable device 50 is connected to the recording/reproducing device 10, the files stored in the recording/reproducing device 10, for example, tunes are duplicated or shifted to the data file storage section in the portable device 50. It is also possible to carry out control so that the files stored in the data file storage section in the portable device 50 are duplicated or shifted to the data file storage section in the recording/reproducing section 10.

By shifting or duplicating a desired file of the files stored in the recording/reproducing device 10 to the portable device 50, the user can use the file on the portable device 50. For example, the user can shift to the portable device 50 the files of tunes to which he/she wants to listen on that day and listen to the tunes by using the portable device 50 outdoors.

In the information distribution system, there may be a number of servers which distribute information, for example, an information distribution center 7. This information distribution center 7 is similar to the distribution/accounting center 1 in that various kinds of chargeable or free information to the user, but it does not carry out accounting processing with respect to the user. Specifically, the accounting processing with respect to the user is entirely managed by the distribution/accounting center 1, and the distribution center 7 charges to the distribution/accounting center 1 the fee for the offer of information to the user.

As information providing means to the user, a down-load device 6 arranged at a train station or at a shop may be considered. In the down-load device 6, a loading section MT is formed in which the portable device 50 can be loaded. The loading section MT is similar to a loading section MT of the recording/reproducing device 10, which will be described later. The user can load his/her portable device 50 to the loading section MT of the down-load device 6 and obtain or purchase desired information in the form of a so-called vending machine. The down-load device 6 is managed by the distribution/accounting center 1 or the distribution center 7. The down-load device 6 sequentially receives necessary information from the distribution/accounting center 1 or the distribution center 7 and transfers the received information to the portable device 50. The down-load device 6 thus sells various kinds of information to the user.

Figure 2:
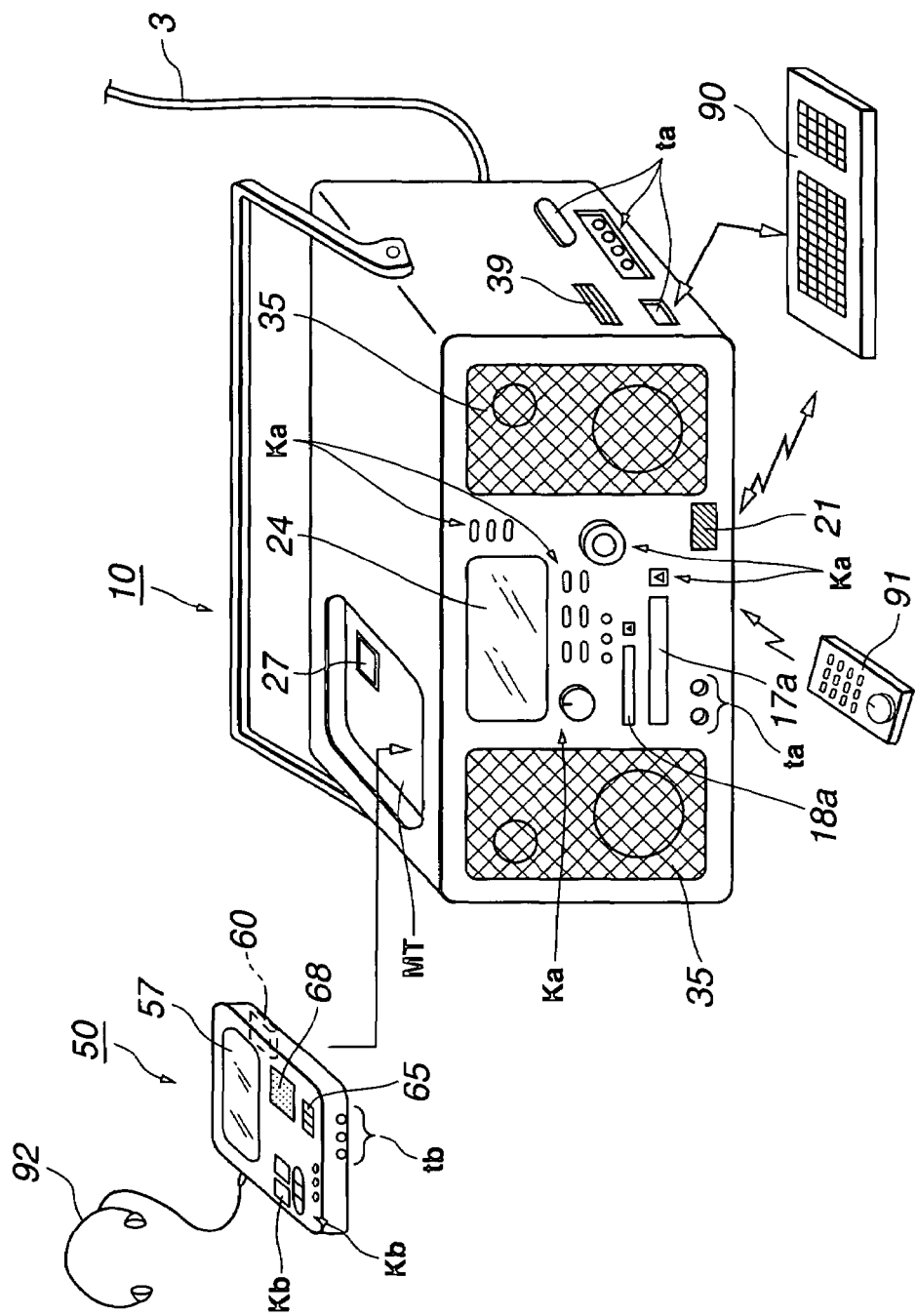
FIG. 2 is a perspective view showing a recording/reproducing device and a portable device to which the present invention is applied.

FIG. 2 shows the appearance of the recording/reproducing device 10 and the portable device 50. In this description, only an example is employed and therefore various other types can be employed for the appearance of each equipment, the user interface structure, that is, the structure for operation and display, and the mode of connection between the recording/reproducing device 10 and the portable device 50.

As shown in FIG. 2, the recording/reproducing device 10 is a so-called radio cassette-type equipment suitable for the use at the user's home. The recording/reproducing device 10 may also be of a component type.

In the recording/reproducing device 10, operation keys and operation knobs for the user to carry out various operations, and various rotary/press keys which are rotated to change the menu and pressed to decide the menu are provided as operators Ka on the front panel of the equipment. Also, in the recording/reproducing device 10, a speaker 35 for outputting playback sound and a display section 24 for displaying various information are provided as output means to the user. The display section 24 is made up of, for example, a liquid crystal panel.

For the user to reproduce data from an optical disc of the user by using the recording/reproducing device 10 or to dub data from the optical disc to an internal hard disk, which will be later described, an optical disc insertion section 17a for inserting the optical disc into an internal CD-ROM (compact disc read-only memory) driver 17 is provided in the recording/reproducing device 10.

Similarly, for the user to record/reproduce data to/from a magneto-optical disc of the user by using the recording/reproducing device 10 or to dub data from the magneto-optical disc to the internal hard disk, a magneto-optical disc insertion section 18a for inserting the magneto-optical disc into an internal MD (mini disc) drive 18 is provided in the recording/reproducing device 10.

In addition, in the recording/reproducing device 10, various terminals ta for connection with other equipments are prepared. The terminals ta are terminals for connection of a microphone and headphones, and are also a line connection terminal, an optical digital connection terminal and an interface connector for connection with other audio-visual equipments and personal computers.

As the user-operated input means in the recording/reproducing device 10, a keyboard 90 and a remote commander 91 are used as well as the above-described operators Ka.

When the keyboard 90 is connected to a keyboard connector of the terminals ta, the operation information from the keyboard 90 is inputted to the recording/reproducing device 10 via the terminal ta. If an infrared transmission section is provided on the keyboard 90, the operation information from the keyboard 90 is outputted in an infrared radio system and the operation information is inputted to the recording/reproducing device 10 from a light receiving section 21.

The remote commander 91 outputs the operation information, for example, in an infrared system. The operation information by means of the infrared signal is inputted to the recording/reproducing device 10 from the light receiving section 21. The output of the operation information in the case where the keyboard 90 employs the radio system and the output of the operation information from the remote commander 91 may use radio waves instead of infrared rays.

In the recording/reproducing device 10, a PCMCIA (Personal Computer Memory Card International Association) slot 39 is also provided so that data transmission with other equipments via the PCMCIA card is possible.

The portable device 50 is a small-size light-weight equipment so as to be suitable for the portable use by the user. In the portable device 50, various operation keys for the user to carry out various operations are provided as operators Kb. Although not shown, a rotary/press jog dial may be provided.

In the portable device 50, a speaker 68 for outputting playback sound and a display section 57 for displaying various information are provided as output means to the user. The display section 57 is made up of, for example, a liquid crystal panel. In the portable device 50, a microphone 65 is provided as input means for the user.

In the portable device 50, various terminals tb for connection with other equipments are also provided. The terminals tb are terminals for connection of a microphone and headphones, and are also a line connection terminal, an optical digital connection terminal and an interface connector for connection with other audio-visual equipments and personal computers. For example, when the user carries the portable device 50 and listens to music or the like, the user can reproduce the sound from the speaker 68 or can listen to the music or the like using headphones 92 by connecting the headphones 92 to a headphone terminal of the terminals tb.

By connecting the recording/reproducing device 10 with the portable device 50, communication of various data between the recording/reproducing device 10 and the portable device 50, for example, communication of data of a real file like audio data and control data required for communication processing can be carried out.

In this example, a loading section MT having a connector 27 is provided in the recording/reproducing device 10 so that the recording/reproducing device 10 and the portable device 50 are connected with each other by loading the portable device 50 into the loading section MT. When the portable device 50 is loaded in the loading section MT, a connector 60 provided on the lower part of the portable device 50 is connected with the connector 27 in the loading section MT, and data communication between the two equipments is carried out via the connectors 60, 27. For the connection of the recording/reproducing device 10 and the portable device 50, a line connection system using a communication cable or a wireless connection system using infrared rays or the like may be employed.

Figure 3:
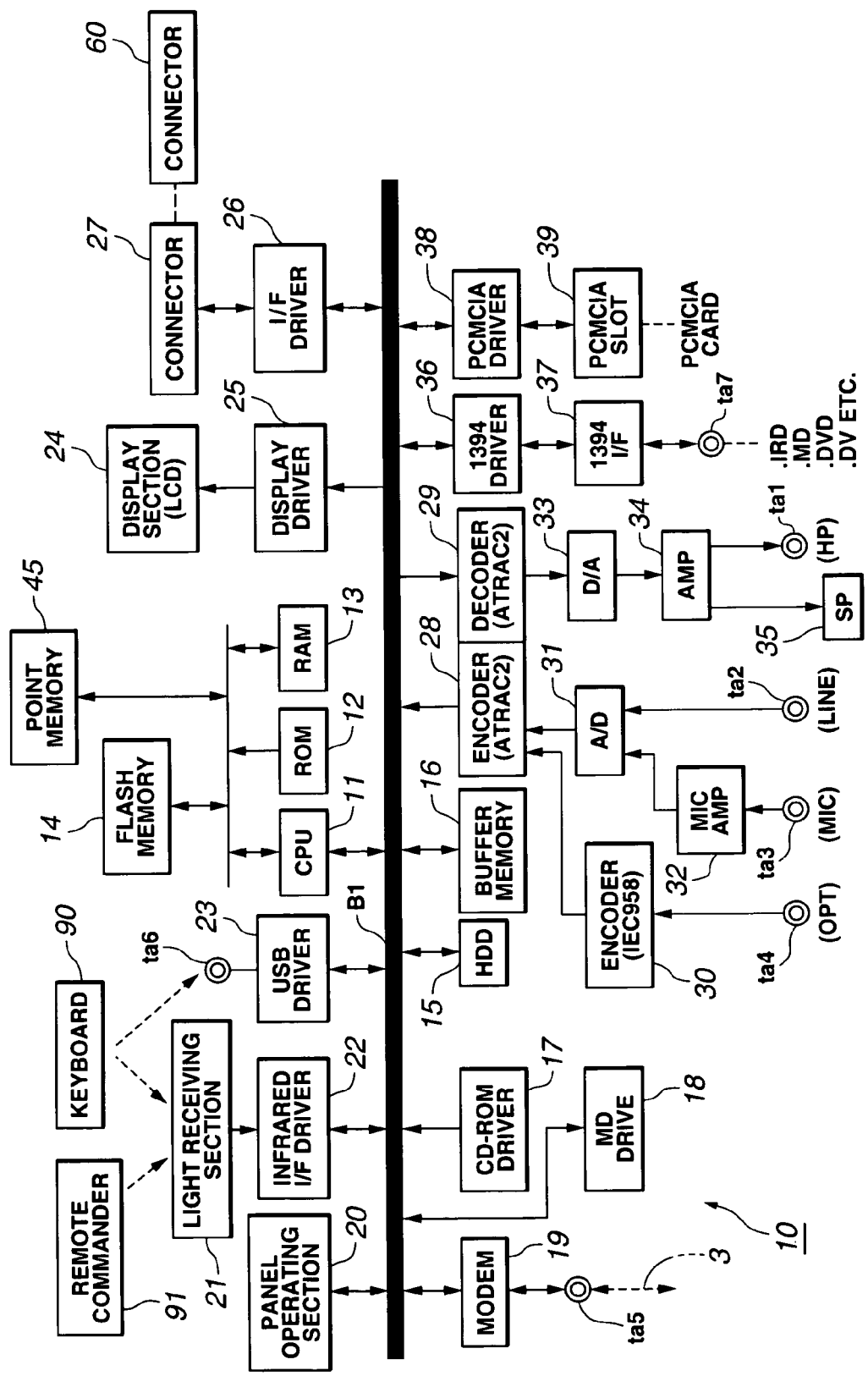
FIG. 3 is a block diagram showing the specific structure of the recording/reproducing device to which the present invention is applied.

The specific internal structure of the recording/reproducing device 10 will now be described with reference to FIG. 3.

In the recording/reproducing device 10, push-type and rotary/press-type operators Ka are provided as a panel operating section 20 as described above. Although not described with reference to FIG. 2, operation key display may be presented on the display section 24 and a touch detection mechanism may be provided on the display section 24 so as to form a touch panel operator. In such case, the touch panel operator is included in the panel operating section 20 of FIG. 3. As the panel operating section 20 is operated by the user, operation signals for causing the recording/reproducing device 10 to execute various operations are generated and the recording/reproducing device 10 operates in response to the operation signals.

For example, the keyboard 90 and the remote commander 91 can be used as described above in order to facilitate input of the title of a tune or the name of an artist corresponding to the audio information to be recorded. The input by using the keyboard 90 is made possible by connecting the keyboard 90 to a USB (universal serial bus) terminal ta6. In other words, an input signal from the keyboard 90, that is, an operation signal, is supplied to a USB driver 23 via the USB terminal ta6 and taken into the recording/reproducing device 10. The terminals ta1 to ta7 in FIG. 3 correspond to respective ones of the terminals ta shown in FIG. 2.

The operation signal by means of infrared rays from the remote commander 91 and the operation signal in the case where the keyboard 90 carries out infrared output are photoelectrically converted by the light receiving section 21, then supplied to an infrared interface driver 22, and taken into the recording/reproducing device 10. The data may also be outputted to the outside through the infrared interface driver 22 or the USB driver 23.

In the recording/reproducing device 10, a RAM 13, a ROM 12, and a flash memory 14 are provided, which are components of an ordinary personal computer. The operation of the whole recording/reproducing device 10 is controlled by the CPU 11. The transmission/reception of file data and control data between respective blocks is carried out via a bus B1.

In. the ROM 12, a program is stored for controlling the operation of the recording/reproducing device 10 in response to an input signal inputted by operating the panel operating section 20 or an input signal from the keyboard 90 or the remote commander 91. In the RAM 13 and the flash memory 14, a data area and a task area required for executing the program are temporarily secured. A program loader may be stored in the ROM 12 so that the program itself can be loaded to the flash memory 14 by the program loader.

A storage section for storing the number of points, which is the accounting point information, is provided as a point memory 45. The point memory 45 is constituted by a non-volatile memory or a RAM having a backup power. In the point memory 45, at least the number of points used for accounting is stored. Update of the number of points, that is, subtraction of points, and initialization, that is, restoration to the initial point, are carried out by the CPU 11 as will be later described in detail.

On the CD-ROM drive 17, an optical disc is loaded from the above-described optical disc insertion section 17a. The information recorded on the optical disc is read out by an optical pickup of the CD-ROM drive 17 at a normal speed or a high speed such as 16-tuple or 32-tuple speed. On the MD drive 18, an optical disc or magneto-optical disc is loaded from the above-described magneto-optical disc insertion section 18a. By an optical pickup of the MD drive 18, the information recorded on the optical disc or magneto-optical disc is read out, or information is recorded onto the optical disc or magneto-optical disc. Although the CD-ROM drive 17 and the MD drive 18 are provided in this example, it is also possible to provide only one of these drives or to provide a drive corresponding to another medium for storing information such as a magnetic disk or a memory card.

As large-capacity storage means inside the recording/reproducing device 10, a hard disk drive (HDD) 15 for carrying out recording/reproduction of information to/from the hard disk is provided. For example, audio information read out from the CD-ROM 17 or the MD drive 18 is stored into the HDD 15 on the file basis, that is, one tune as one file.

In the recording/reproducing device 10, there are also provided an encoder 28 for compressing audio data in accordance with the ATRAC2 (Adaptive Transform Acoustic Coding 2, trademark) system, and a decoder 29 for decoding audio data compressed in accordance with the ATRAC2 system. The encoder 28 and the decoder 29 carry out encoding and decoding of the audio data supplied thereto, respectively, under the control of the CPU 11. In the recording/reproducing device 10, a buffer memory 16 is provided for temporarily storing audio data as processing target. The buffer memory 16 carries out data writing/reading under the control of the CPU 11.

In the case where audio data read out from the optical disc by the CD-ROM drive 17 is to be transferred to the HDD 15, the audio data read out from the optical disc is temporarily stored in the buffer memory 16 and the audio data is supplied to and encoded by the encoder 28 in accordance with the ATRAC2 system, as preprocessing for recording the audio data onto the HDD 15. Moreover, the data encoded by the encoder 28 is temporarily stored again in the buffer memory 16 and the encoded audio information is ultimately stored onto the HDD 15.

In this example, the recording/reproducing device 10 is constituted so that the audio data encoded in accordance with the ATRAC2 system by the encoder 28 is stored onto the HDD 15. However, the recording/reproducing device 10 may also be constituted so that the data read out from the CD-ROM drive 17 is stored as it is onto the HDD 15.

The encoder 28 not only encodes the audio data read out from the optical disc loaded on the CD-ROM drive 17. An audio signal inputted through an amplifier 32 via a microphone terminal ta3 connected with a microphone and an audio signal inputted from a line input terminal ta2 connected with another equipment such as a CD player are also inputted to the encoder 28 via an A/D converter 31. These input audio data, too, are encoded by the encoder 28. In addition, the recording/reproducing device 10 is constituted so that data inputted from an external equipment such as a CD player connected to an optical digital terminal ta4 is inputted to the encoder 28 via an IEC958 (International Electrotechnical Commission 958) encoder 30. Such digitally inputted data, too, is encoded by the encoder 28.

In the recording/reproducing device 10, after the data inputted from the external equipment as described above is encoded by the encoder 28, the encoded data can be stored onto the HDD 15 on the file basis. While ATRAC2 is used as the encode algorithm of the encoder 28, any encode algorithm for compressing information may be used, for example, ATRAC (trademark), MPEG (Moving Picture Experts Group), PASC (Precision Adaptive Subband Coding), Twin VQ (trademark), Real Audio (trademark), Liquid Audio (trademark), and MS Audio (Microsoft Audio, trademark).

In the recording/reproducing device 10, a modem 19 is provided, which is an interface connectable to an external network connected as the communication channel 3 to a communication terminal ta5, for example, the Internet, a TEL network, a cable TV, and a wireless network. Through the modem 19, a request signal, medium information of a medium loaded on the CD-ROM drive 17, user ID, user information and user accounting information are transmitted to a server at a remote location.

On the side of the server of the external network, that is, the server that can be connected via the communication channel 3, collation processing using the user ID, accounting processing, and retrieval of music additional information from the disc information such as the title of the tune, the name of the artist, the composer, the lyrics writer, the lyrics and the jacket image are carried out. The server of the external network is controlled to return predetermined information requested by the user, to the recording/reproducing device 10. In this example, additional related information of the music is returned. However, the tune information requested by the user may be down-loaded directly from the external network. Also, the tune information may be returned corresponding to the medium information so that a bonus track of a predetermined medium may be obtained by the recording/reproducing device 10 through distribution. In the above-described manner, the chargeable information is provided to the user from the server of the external network, and the recording/reproducing device 10 stores the information onto the HAD 15.

The audio information stored on the HAD 15 is decoded by the decoder 29 and a playback sound is outputted from the speaker 35 through a D/A converter 33 and an amplifier 34.

Alternatively, a playback sound is outputted from headphones by connecting the headphones to the headphone terminal tax. In this example, the decoder 29 carries out decoding in accordance with the OUTRACE system. However, any decode algorithm may be used as long as it corresponds to the encode algorithm of the encoder 28. Also, software processing by the CPU 11 may be employed, instead of constituting the encoder 28 and the decoder 29 as hardware.

In the recording/reproducing device 10, the display section 24 is provided, as also shown in FIG. 2, as an interface for the user to manage and control files of audio data and the like stored on the HAD 15. The display section 24 is driven by a display driver 25. In the display section 24, required characters, symbols and icons are displayed under the control of the CPU 11.

In the display section 24, a folder corresponding to an audio file (hereinafter, a file in which audio data like music tunes are recorded is referred to as an audio file, as a matter of convenience), or a jacket image is displayed, and the operation thereof is made possible by a pointing device corresponding to the panel operating section 20 such as a touch by a mouse, a pen or the user's finger. For example, the operation to reproduce an audio file indicated by the user on the display section 24 is carried out under the control of the CPU 11.

Also, the touch panel function of the display section 24 enables erasure of an audio file selected by the user on the touch panel and duplication or shift to an external equipment such as the portable device 50 under the control of the CPU 11. Alternatively, the display section 24 can graphically display html (hyper text markup language) text as related information retrieved from the world wide web (WWW) site on the Internet on the basis of the table of contents (TOC) information of the optical disc loaded on the CD-ROM drive 17, and can be used as an ordinary Internet browser.

The recording/reproducing device 10 is constituted so that audio information is taken from various equipments or systems connected to the terminal ta7 such as a satellite broadcasting IRD (integrated receiver/decoder), an MD player, a DVD (digital video disc) player and a DV (digital video) player, via an IEEE (the Institute Electronics Engineers, Inc.) 1394 interface 37 and an IEEE1394 driver 36. In the recording/reproducing device 10, the PCMCIA (Personal Computer Memory Card International Association) slot 39 is provided as an additional function, as described above, so that a PCMCIA card can be inserted from the PCMCIA slot 39 to a PCMCIA driver 38. Thus, extension of an external storage device and various other peripheral equipments such as a medium drive, a modem, a terminal adapter and a capture board can be realized easily.

As described with reference to FIG. 2, the connector 27 for connection with the portable device 50 is provided in the recording/reproducing device 10. As the connector 27 is connected with the connector 60 of the portable device 50, the CPU 11 can communicate various data with the portable device 50 through the interface driver 26. For example, under the control of the CPU 11, the interface driver 26 transfers the audio file stored on the HDD 15 to the portable device 50 via the connectors 27, 60.

Figure 4:
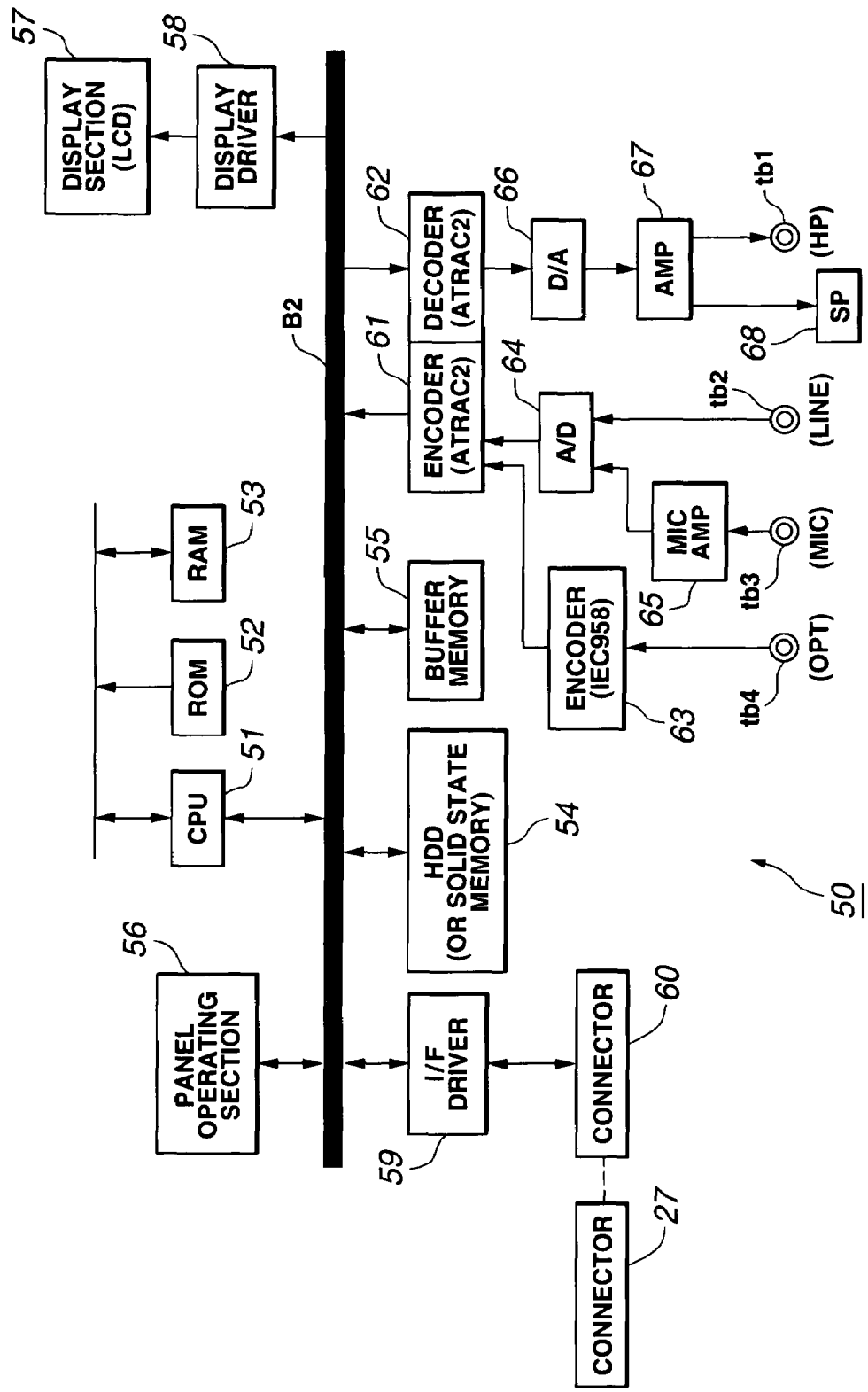
FIG. 4 is a block diagram showing the specific structure of the portable device to which the present invention is applied.

The specific internal structure of the portable device 50 will now be described with reference to FIG. 4.

The recording/reproducing device 10 and the portable device 50 are electrically connected with each other as the connector 27 and the connector 60 are connected with each other. Specifically, the interface driver 26 of the recording/reproducing device 10 and an interface driver 59 of the portable device 50 are connected with each other to enable data communication between the two equipments.

In the portable device 50, the push-type and rotary/press-type operators Kb as described above are provided as a panel operating section 56. By operating the operators Kb of the panel operating section 56, an operation signal for instructing the operation of the portable device 50 is transmitted to a control bus B2 and the portable device 50 operates in accordance with the operation signal.

In the portable device 50, similarly to the recording/reproducing device 10, a RAM 53 and a ROM 52 are provided, which are components of an ordinary personal computer, and the operation of the whole portable device 50 is controlled by a CPU 51. Transmission/reception of file data and control data between respective blocks is carried out via the bus B2.

In the ROM 52, a program to be executed by the CPU 51 in accordance with the operation signal inputted by operating the panel operating section 56 is stored. In the RAM 53, a data area and a task area required for executing the program are temporarily secured. In the portable device 50, a flash memory may be loaded as in the recording/reproducing device 10, and the bus structure is not limited to any specific system.

As internal storage means of the portable device 50, a hard disk driver (HDD) 54 for carrying out recording/reproduction of information to/from a hard disk is provided. For example, audio information transferred from the recording/reproducing device 10 via an interface (I/F) driver 59 is stored onto the HDD 54 on the file basis, for example, one tune as one file. A solid state memory such as a flash memory may be used as the storage means in place of the HDD.

In the portable device 50, similarly to the recording/reproducing device 10, an encoder 61 for compressing audio data in accordance with the OUTRACE system and a decoder 62 for decoding audio data compressed in accordance with the OUTRACE system are provided. The encoder 61 and the decoder 62 carry out encoding and decoding of the audio data supplied thereto, respectively, under the control of the CPU 51. In the portable device 50, a buffer memory 55 is provided for temporarily storing audio data as a processing target. The buffer memory 55 carries out data writing/reading under the control of the CPU 51.

For example, in the case where audio data which is not encoded in accordance with the OUTRACE system is supplied from the recording/reproducing device 10 via the interface driver 59, the audio data is temporarily stored in the buffer memory 55 and the audio data is supplied to and encoded by the encoder 61 in accordance with the OUTRACE system, as preprocessing for recording the audio data onto the HAD 54. Moreover, the encoded data is temporarily stored again in the buffer memory 55 and the encoded audio information is ultimately stored onto the HAD 54.

In this example, audio files encoded in accordance with the OUTRACE system are stored on the HAD 15 of the recording/reproducing device 10. Therefore, in the case where the audio file stored on the HAD 15 is supplied via the interface driver 59 and stored onto the HAD 54, that is, in the case where the data file of a tune is duplicated or shifted from the HAD 15 to the HAD 54, the processing by the encoder 61 is not necessary. Meanwhile, the audio data read out from the optical disc loaded on the CD-ROM drive 17 of the recording/reproducing device 10, that is, non-compressed audio data, may be inputted as it is via the interface driver 59. In such case, encoding by the encoder 61 is carried out as described above as the processing for recording the audio data onto the HAD 54.

In this example, the portable device 50 is constituted so that the audio data encoded in accordance with the OUTRACE system by the encoder 61 is stored onto the HAD 54. However, the portable device 50 may also be constituted so that non-compressed audio data is stored as it is onto the HAD 54.

In the portable device 50, as the means for supplying the audio data to the encoder 61 for compression, a microphone terminal Tb, a line input terminal Tb, and an optical digital terminal Tb are provided as well as the above-described interface driver 59. The terminals Tb to Tb in FIG. 4 correspond to the respective ones of the terminals tb shown in FIG. 2.

The encoder 61 is constituted so that an audio signal inputted through an amplifier 65 from the microphone terminal tb3 connected with a microphone or an audio signal inputted from the line input terminal tb2 connected with another equipment such as a CD player is inputted through an A/D converter 64. Such input audio data, too, is encoded by the encoder 61. Moreover, the portable device 50 is constituted so that data inputted from an external equipment (e.g., CD player) connected to the optical digital terminal tb4 is inputted to the encoder 61 via an IEC958 encoder 63. The data thus digitally inputted is also encoded by the encoder 61.

In the portable device 50, after the data inputted from the external equipment as described above is encoded by the encoder 61, the encoded data can be stored onto the HDD 54 on the file basis. The encode algorithm of the encoder 61 is not limited to ATRAC2 and may be another encode algorithm for compressing information such as ATRAC, MPEG, PASC, Twin VQ, Real Audio, or Liquid Audio.

The audio information stored on the HDD 54 is decoded by the decoder 62 and a playback sound is outputted from the speaker 68 via a D/A converter 66 and an amplifier 67. Alternatively, a playback sound is outputted from headphones by connecting headphones to the headphone terminal tbl. Although the decoder 62 carries out decoding in accordance with the ATRAC2 system in this example, any decode algorithm may be employed as long as it corresponds to the encode algorithm of the encoder 61. Also, software processing by the CPU 51 may be employed, instead of constituting the encoder 61 and the decoder 62 as hardware.

In addition, in the portable device 50, the display section 57 is provided, as also shown in FIG. 2, as an interface for the user to manage and control files of audio data and the like stored on the HDD 54. The display section 57 is driven by a display driver 58. In the display section 57, required characters, symbols and icons are displayed under the control of the CPU 51.

In the display section 57, a folder corresponding to an audio file or a jacket image is displayed, and the operation thereof is made possible by a pointing device corresponding to the panel operating section 20 such as a touch by a mouse, a pen or the user's finger. For example, the operation to reproduce from the speaker 68 an audio file indicated by the user on the display section 57 is carried out under the control of the CPU 51.

Also, the touch panel function of the display section 57 enables erasure of an audio file selected by the user on the touch panel and duplication or shift to an external equipment such as the recording/reproducing device 10 under the control of the CPU 51.

As described with reference to FIG. 2, data transmission/reception between the portable device 50 and the recording/reproducing device 10 is made possible by loading the portable device 50 to the loading section MT of the recording/reproducing device 10. However, the portable device 50 may have a non-contact interface such as IrDA.

Although not shown, a charging current supply section is provided in the recording/reproducing device 10. The charging current supply section may supply a charging current to the portable device 50 loaded therein so as to charge a charge-type battery, which is the operation power source of the portable device 50.

Figure 5:
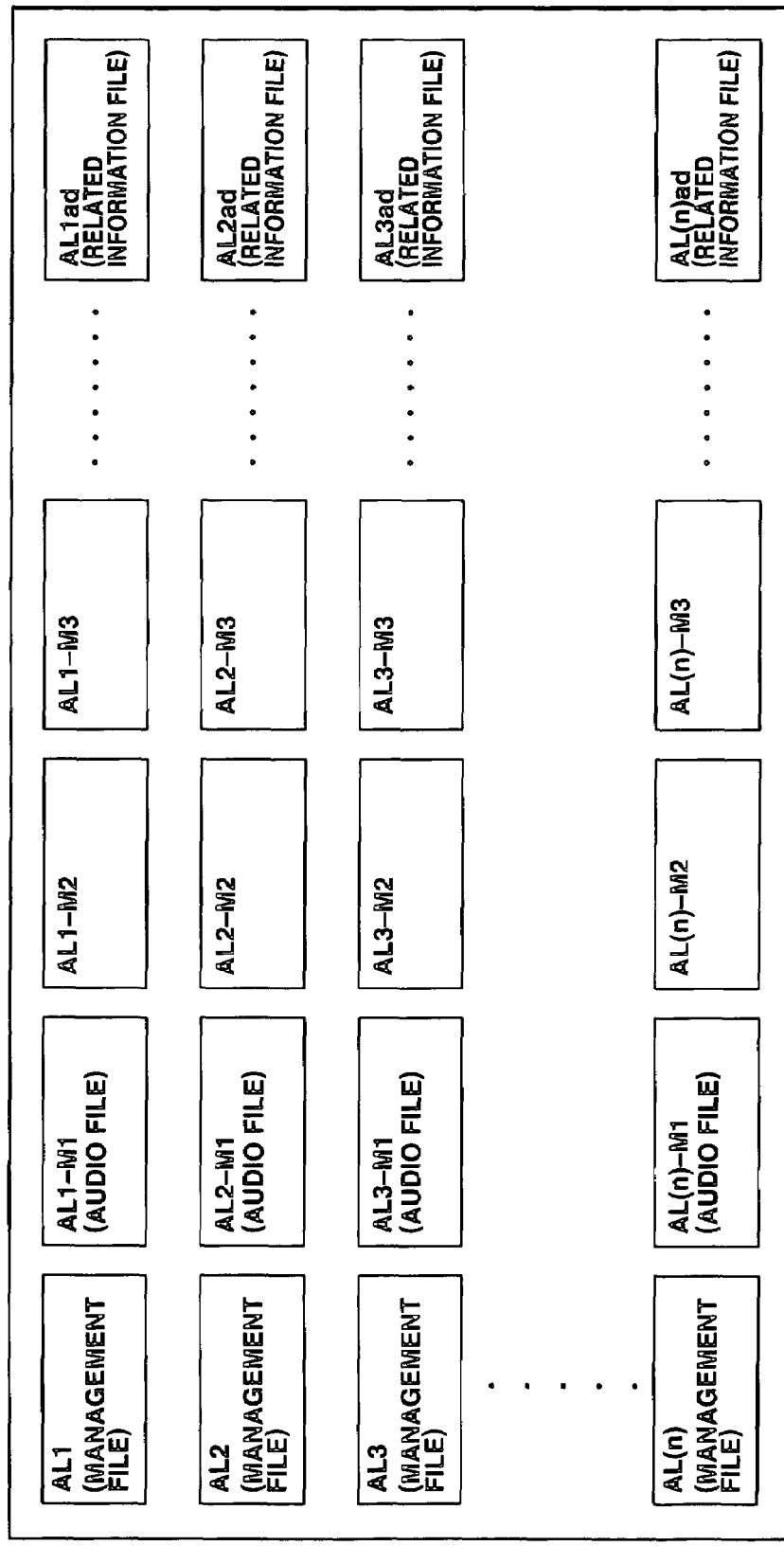
FIG. 5 shows a specific example of a file storage mode in a hard disk drive (HDD) 15 constituting the recording/reproducing device.

FIG. 5 shows a specific example of the file storage mode in the HDD 15 of the recording/reproducing device 10.

For example, the user loads his/her CD onto the CD-ROM drive 17 and records, that is, duplicates each recorded music tune as a file onto the HDD 15. Alternatively, the user can send a request to the distribution/accounting center 1, then receive information of a music album in response to the request, and record each music tune of the music album as each file onto the HDD 15.

As the data is thus stored on the album basis like CD, a management file is formed for each album and each music tune is stored as one audio file.

FIG. 5 shows the state where n music albums are recorded on the HDD 15. Management files AL (AL1 to AL(n)) corresponding to the respective albums are formed. Music tunes recorded on each album are stores as audio files, while corresponding to the management file AL.

In FIG. 5, files shown in one row express files constituting one album. Dubbing data from a certain CD, that is, respective tunes, are stored as audio files AL1-M1, AL1-M2, AL1-M3, . . . corresponding to the management file AL1. Data from another album, that is, respective tunes, are stores as audio files AL2-M1, AL2-M2, AL2-M3, . . . corresponding to the management file AL2. That is, AL(n)-M1, AL(n)-M2, AL(n)-M3, . . . are the actual music data.

In this manner, in recording one album to the HDD 15, audio files corresponding to the number of recorded tunes are formed together with one management file.

In recording a certain music album to the HDD 15, the user inputs data or receives chargeable or free related information with respect to the album from the distribution/accounting center 1, thereby storing such information as a related information file. For example, a related information file AL1ad is formed corresponding to the management file AL1. Data stored as the related information file AL(*)ad includes text data such as the title of tunes, the name of the artist, lyrics and messages, image data such as a tune image and an image of the artist, the home page address (URL) of the artist, copyright-related information, names of parties concerned (lyrics writer, composer, producer) and the like, as described above.

The management file AL(*) includes various kinds of management information related to the corresponding one or plural audio files and related information files, and is used for reproduction, shift, duplication and editing of each audio file and related information file. For example, the management file AL1 contains management information for the whole group of files constituting a certain album, management information related to the respective audio files AL1-M1, AL1-M2, AL1-M3, ..., and management information related to the related information file AL1ad.

FIG. 6 shows a specific example of management information recorded in the management file.

Album information, which is the management information for the whole album, includes, for example, the type and number of files, album title, data size, date and time information of recording, names of parties concerned (album producer, lyrics writer, composer, performer, etc.), copyright information, album ID, information use permission flag, and various other management information. The information use permission flag is a flag for preventing the use of information in the state where appropriate accounting is not made with respect to the chargeable information. This function will be described later.

In the management file AL(*), file information (#1) to file information (#m) are also recorded as management information corresponding to individual audio files. The file information includes, for example, the type of the corresponding file, address pointer indicating the recording position of the corresponding file on the HDD 15, data size of the file, title (title of tune, etc.), date and time information of recording, names of parties concerned (lyrics writer, composer, performer, etc.), copyright information, information use permission flag, and various other management information.

Moreover, in the management file AL(*), related file information is recorded as management information for managing the corresponding related information file. The related file information includes, for example, the type and number of corresponding related information files, address pointer indicating the recording position of the corresponding related information file on the HDD 15, data size of the related information file, date and time information of recording, names of parties concerned, copyright information, information use permission flag, and various other management information.

As such management information is recorded in the management file (*), the recording/reproducing device 10 is enabled to carry out various processing such as reproduction, shift, duplication, and editing of a specified tune. Under the control of the CPU 11, the recording/reproducing device 10 is also enabled to output images and texts as related information along the operation of reproduction of the tune.

The file storage mode shown in FIG. 5 and the contents of the management information shown in FIG. 6 are only examples. In reality, any file storage mode and management mode suitable for various processing of audio data files, which are real data to be stored, may be employed. The audio data files need not be managed on the album basis and can be managed as a group of tunes preferred by the user or as a group of each genre in accordance with the instruction from the user. Not only audio files of tunes but also dynamic image data, still image data, text data, and programs as game software may be stored as real files, that is, as related information files but as independent files.

In the HDD 54 of the portable device 50, too, a file storage mode similar to that of HDD 15 may be employed.

The accounting processing according to the present invention will now be described.

As described above, the user can purchase information by, for example, storing chargeable information distributed from the distribution/accounting center 1 or the distribution center 7 onto the HDD 15 of the recording/reproducing device 10. The user also can purchase information by loading the portable device 50 into the down-load device 6 and recording arbitrary information onto the HDD 54. The chargeable information recorded on the HDD 54 in the portable device 50 can be shifted to the HDD 15 of the recording/reproducing device 10 and made available there, or can be used or reproduced as it is stored on the HDD 54 of the portable device 50.

The chargeable information stored on the HDD 15 or the HDD 54 cannot be used when appropriate accounting is not carried out. For example, with respect to the chargeable information, the information use permission flag shown in FIG. 6 is set to the off-state, that is, the use prohibition state in recording to the HDD 15 or the HDD 54. The appropriate accounting by the user switches the information use permission flag to the on-state, that is, the use permission state.

The CPU 11 or the CPU 51 confirms the information use permission flag of the file stored on the HDD 15 or the HDD 54 and controls the execution of the reproducing operation or the like, thus setting the use prohibition state, that is, prohibiting the use by the user of the file for which accounting is not carried out.

The accounting processing for making the file available is the processing of points stored in the point memory 45 and is not the accounting processing at the distribution/accounting center 1.

Specifically, when the point processing is carried out in the recording/reproducing device 10, the file as the chargeable information inputted to the recording/reproducing device 10 and recorded on the HDD 15 is made available to the user.

In the following example of the accounting processing, the number of points PT and point use records R1, R2, . . . as shown in FIG. 7 are stored into the point memory 45.

In this example, the number of points PT is set at a fixed value, for example, 100 points, as an initial value. Every time the chargeable information is inputted to the recording/reproducing device 10 and recorded onto the HDD 15, the CPU 11 subtracts the number of points equivalent to the fee of the information contents from the stored number of points PT and thus updates the number of points PT. This processing is the accounting processing in the recording/reproducing device 10.

The point use records R1, R2, . . . are added in accordance with the consumption of the number of points PT, that is, the input of the chargeable information. The contents of this data include the date and time of input of chargeable data, name of data, number of subtraction points, and payee (name of seller, name of copyright holder, etc.)

In this manner, the accounting processing in the recording/reproducing device 10 is executed by subtracting the number of points PT in accordance with the input of chargeable information. The CPU 11 thus regards that the user paid the fee and permits the use of the chargeable information. That is, the CPU 11 sets the above-described information use permission flag in the on-state.

Meanwhile, the actual accounting, for example, the processing for drawing the fee from the bank account of the user is carried out at the distribution/accounting center 1 through communication between the CPU 11 and the distribution/accounting center 1, which is carried out periodically or when the number of points PT is insufficient.

The operation of the CPU 11 for realizing such accounting processing will be described with reference to the flowcharts of FIGS. 8 to 10, and the processing at the distribution/accounting center 1 will be described with reference to the flowchart of FIG. 11.

Figure 8:
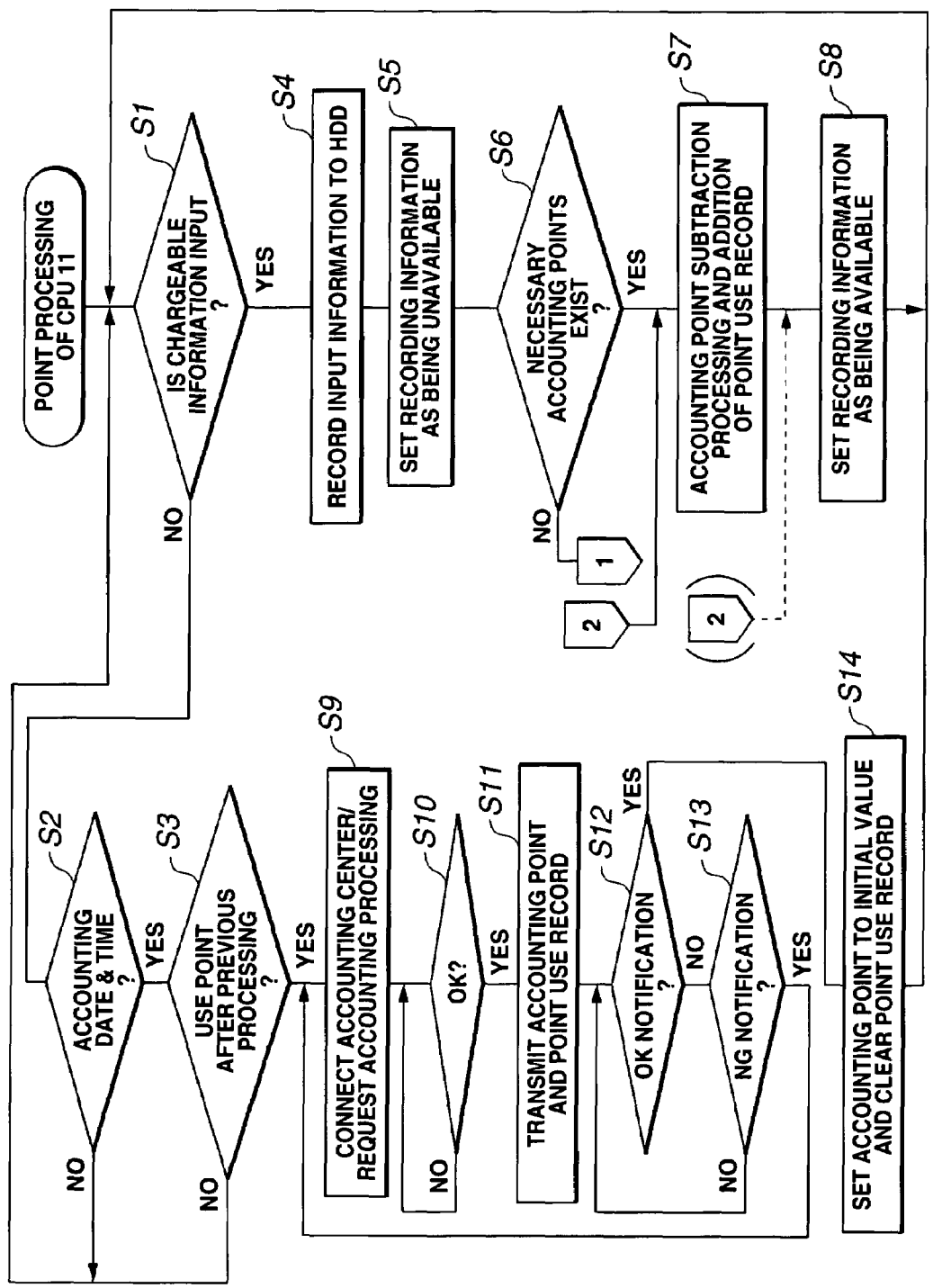
FIG. 8 is a flowchart illustrating specific operation of the central processing unit (CPU) of the recording/reproducing device in the first accounting processing.

At steps S1 and S2 of FIG. 8, the CPU 11 monitors whether chargeable information is constantly inputted or whether the periodical accounting date and time have been reached, with respect to the accounting processing.

When the chargeable information is provided from the distribution/accounting center 1 in response to a request for purchase of information by the user, the CPU 11 advances from step S1 to step S4 so as to carry out operation control for recording the input information to the HDD 15. At step S5, the CPU 11 sets the information use permission flag in the off-state, that is, the use prohibition state, with respect to the file stored on the HDD 15.

At step S6, the CPU 11 discriminates whether or not the number of points equivalent to the fee for the information now inputted is left as the number of points PT in the point memory 45.

If the number of points PT is left, the CPU 11 at step S7 subtracts the number of points PT and additionally stores a point use record R(x) with respect to this information purchase to the point memory 45. Specifically, the CPU 11 finds and updates the number of points PT in accordance with the following equation.

Number of points PT=(number of points PT)−(number of points equivalent to fee for information of this time)

The CPU 11 stores the current date and time, name of purchase data, number of subtraction points (=number of points equivalent to fee for information of this time) and payee as one point use record R(x) to the point memory 45. The information such as the name of purchase data and payee is simultaneously transmitted from the information provider such as the distribution/accounting center 1. Such information may be unnecessary depending on the accounting mode, that is, the contract mode of the right holder.

After updating the contents of the point memory 45 at step S7, the CPU 11 at step S8 regards that the fee for the information now stored on the HDD 15 has been paid, and sets the information use permission flag in the on-state, that is, the use permission state, with respect to the information file.

For the user, the information is made available when the temporary accounting, that is, the point subtraction, is carried out with respect to the distributed information. It means that the user can immediately use the information on receiving the distribution of the information, without any latency time for communication with the distribution/accounting center 1 for accounting processing.

The actual accounting processing, for example, the precessing for drawing the fee from the back account of the user is carried out periodically and automatically. Specifically, every predetermined accounting date and time, the processing of the CPU 11 advances from step S2 to step S3. The accounting date and time are preset to a specified time point of each predetermined period, for example, every day or every week, in the processing program of the CPU 11. Since the accounting processing requires communication with the distribution/accounting center 1, it is convenient to set the specified time point during a time period such as midnight in which the user is normally unlikely to use the recording/reproducing device 10. It is possible that the user can set the specified date and time.

At step S3, the CPU 11 discriminates whether or not the number of points PT of the point memory 45 is updated after the previous accounting time point, that is, after the previous accounting processing by the distribution/accounting center 1. That is, the CPU 11 discriminates whether or not the user purchased information.

In this example, every time the accounting processing by the distribution/accounting center 1 is carried out, the number of points of the point memory 45 is restored to the initial value and the point use records R1, . . . are cleared. Therefore, if purchase of information is not carried out, the number of points PT of the point memory 45 is at the initial value and no point use record is stored. In such initial state, the actual accounting processing at the distribution/accounting center 1 need not be carried out this time and therefore the CPU 11 returns from step S3 to the loop of steps S1 and S2.

If the number of points PT of the point memory 45 is not at the initial value and one or more point use records are stored, it means that the user purchased information. Therefore, the processing goes to step S9 and the accounting processing at the distribution/accounting center 1 is carried out.

Specifically, at step S9, the CPU 11 connects the communication channel to the distribution/accounting center 1 and makes an accounting request. Then, at step S10, the CPU 11 waits until an OK notification is received from the distribution/accounting center 1.

Figure 11:
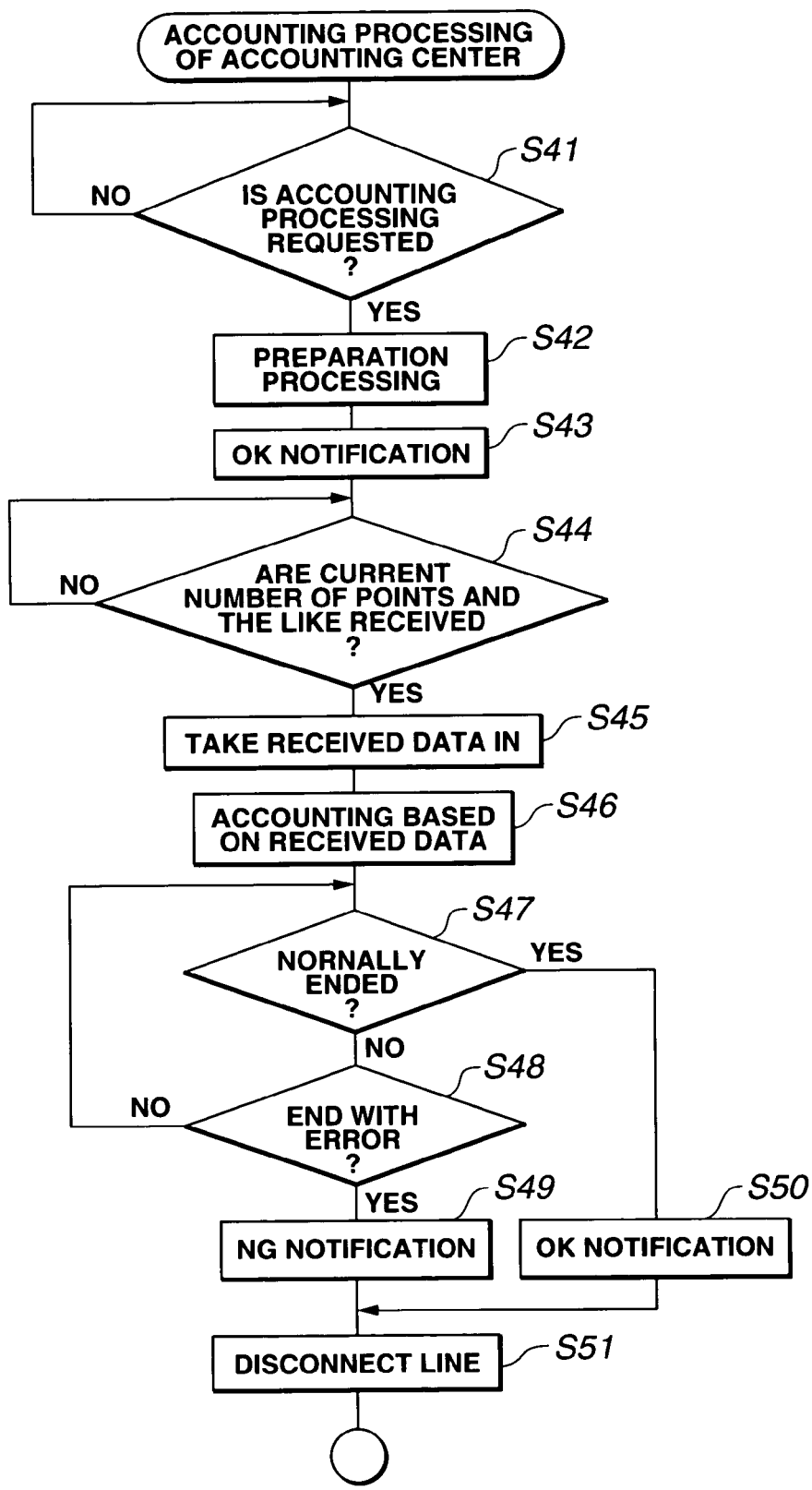
FIG. 11 is a flowchart illustrating specific operation of the distribution/accounting center in the first accounting processing.

In accordance with the channel connection and accounting request at step S9, the processing shown in FIG. 11 is carried out at the distribution/accounting center 1. The distribution/accounting processing at the distribution/accounting center 1 shown in FIG. 11 is executed by a controller or the like of the distribution/accounting center 1, though not shown. Specifically, when an accounting request is sent from a certain recording/reproducing device 10, the controller of the distribution/accounting center 1 advances from step S41 to step S42 to carry out preparation processing for accounting. For example, the CPU 11 transmits necessary information such as the user ID, equipment ID and password number set by the user together with the accounting request, and the controller of the distribution/accounting center 1 carries out authentication processing based on the transmitted information as the preparation processing of step S42. That is, the controller discriminates whether or not the accounting request is an appropriate accounting request from an appropriate user.

On completion of the authentication and other preparation processing, the controller at step S43 sends an OK notification to the recording/reproducing device 10. At step S44, the controller waits for transmission from the recording/reproducing device 10. Although not shown, the processing ends with an error if inconvenience such as an authentication error occurs at step S43.

When the OK notification is sent from the distribution/accounting center 1, the CPU 11 advances from step S10 to step S11 of FIG. 8 and transmits the number of points PT and the point use record stored in the point memory 45 at that time to the distribution/accounting center 1. At step S12 and S13, the CPU 11 waits for an OK notification or NG notification from the distribution/accounting center 1.

On the side of the distribution/accounting center 1, when the number of points PT and the point use record are transmitted from the recording/reproducing device 10, the controller advances from step S44 to step S45 of FIG. 11 and takes the received data. At step S46, the controller carries out accounting processing based on the received number of points PT and point use record. Specifically, since the difference between the initial number of points and the transmitted current number of points is the number of points equivalent to the amount of information purchase by the user, the controller discriminates the number of purchase points and prepares data for drawing from the bank account of the user. The controller also discriminates the right holder who is to receive the fee for the offer of information, from the point user record, and prepares data for distribution of the fee.

When such accounting processing normally ends, the processing at the distribution/accounting center 1 proceeds from step S47 to step S50 and the controller sends an OK notification to the recording/reproducing device 10.

Meanwhile, if an accounting error occurs for a certain reason, the processing proceeds from step S48 to step S49 and the controller sends an NG notification to the recording/reproducing device 10. At step S51, the controller disconnects the line with the recording/reproducing device 10.

When an OK notification is sent from the distribution/accounting center 1, the CPU 11 of the recording/reproducing device 10 determines that the accounting processing by the distribution/accounting center 1 ends properly, and proceeds from step S12 to step S14 to initialize the point memory 45. That is, the CPU 11 restores the number of points PT to the initial value and clears the point use record. Thus, the periodical accounting precessing ends.

If an NG notification is sent from the distribution/accounting center 1, the CPU 11 carries out the processing from step S9 again. If an accounting error occurs at the distribution/accounting center 1, the CPU 11 is to carry out such retrial. Therefore, the processing from step S11 may be executed with the line kept connected.

Meanwhile, in the above-described processing of steps S1 to S8, the temporary accounting processing in the form of point subtraction is carried out at the time of input of chargeable information. In the case where a large volume of information is continuously purchased, there may be the case where the number of points is insufficient at step S6. In such case, the processing proceeds to step S6 to step S21 of FIG. 9 in this example. Specifically, in the case of insufficient points, the CPU 11 provisionally requests accounting processing to the distribution/accounting center 1 so as to carry out processing to restore the number of points to the initial value.

At step S21, the CPU 11 connects the communication channel to the distribution/accounting center 1 and makes a request for accounting processing. At step S22, the CPU 11 waits for an OK notification from the distribution/accounting center 1.

Similarly to the above-described periodical accounting processing, the processing of FIG. 11 is carried out at the distribution/accounting center 1 in accordance with such channel connection and request for accounting. On completion of the preparation processing such as authentication, an OK notification is sent to the recording/reproducing device 10 at step S43. If any inconvenience such as an authentication error occurs, the processing ends with an error.

Figure 9:
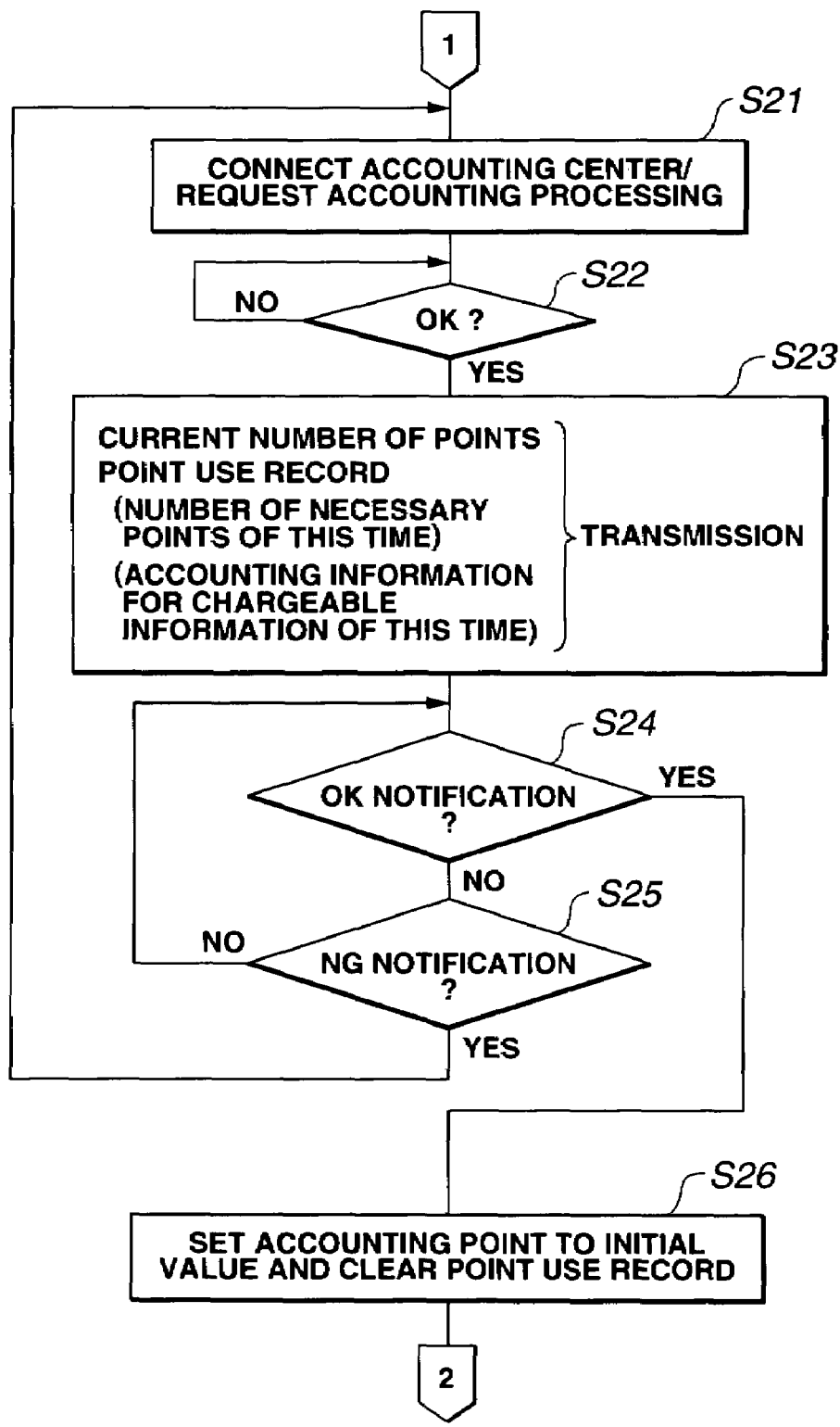
FIG. 9 is a flowchart illustrating specific operation of the CPU when the number of points is insufficient in the first accounting processing.

When an OK notification is sent from the distribution/accounting center 1, the CPU 11 proceeds from step S22 to step S23 of FIG. 9 and transmits the number of points PT and the point use record stored in the point memory 45 at that time to the distribution/accounting center 1. "Number of necessary points of this time" and "accounting information for chargeable information of this time" described in parentheses at step S23 are information to be transmitted in another processing, which will be described later. At steps S24 and S25, the CPU 11 waits for an OK notification or NG notification.

When the number of points PT and the point use record are transmitted from the recording/reproducing device 10, the controller of the distribution/accounting center 1 proceeds from step S44 to steps S45 and S46 of FIG. 11 and carries out accounting processing based on the number of points PT and the point use record, similarly to the above-described above. As the accounting processing normally ends, the controller proceeds to step S50 and sends an OK notification to the recording/reproducing device 10. If an accounting error occurs for a certain reason, the controller proceeds to step S49 and sends an NG notification to the recording/reproducing device 10. At step S51, the controller disconnects the line with the recording/reproducing device 10.

When an OK notification is sent from the distribution/accounting center 1, the CPU 11 of the recording/reproducing device 10 determines that the accounting processing has properly ended, and proceeds from step S24 to step S26 of FIG. 9 so as to initialize the point memory 45. Specifically, the CPU 11 restores the number of points PT to the initial value and clears the point use record. Meanwhile, when an NG notification is sent from the distribution/accounting center 1, the CPU 11 carries out the processing from step S21 again.

As the point memory 45 is initialized at step S26, that is, as the number of points PT is set at the initial value, the number of points equivalent to the fee for the information that is inputted this time is secured. Thus, the CPU 11 proceeds to step S7 of FIG. 8 to subtract the number of points PT in accordance with the information purchase of this time and to additionally store the point use record R(x) with respect to the information purchase of this time.

After thus updating the contents of the point memory 45, the CPU 11 at step S8 regards that the fee has been paid with respect to the information stored on the HDD 15 this time, and sets the information use permission flag in the on-state, that is, the use permission state, with respect to that information file.

In accordance with the above-described processing, even in the case where the number of points is insufficient as the user purchases a large volume of information at a time, the number of points is restored to the initial value through the provisional accounting processing at the distribution/accounting center 1. That is, the temporary accounting processing by means of subtraction of the number of points is made possible. Therefore, the user can use the information without waiting for the periodically executed accounting processing after step S9.

As another example of the processing of step S23 of FIG. 9, the number of necessary points of this time and the accounting information of chargeable information of this time may also be transmitted to the distribution/accounting center 1, as well as the current number of points PT and point use record. In this case, the accounting processing of step S46 of FIG. 11 at the distribution/accounting center 1 includes the processing of the fee for the information input of this time as well as the processing with the number of points PT and point use record, that is, the settlement processing with respect to the information purchase up to immediately before the information input of this time. In such case, since the fee for insufficiency of this time is settled, the processing of step S7 is not necessary and the processing may proceed from step S26 of FIG. 9 to step S8 of FIG. 8, as indicated by a broken line in FIG. 8.

In the case where the user purchased information by recording chargeable information onto the HDD 15 of the recording/reproducing device 10, the accounting processing is carried out as described above. However, the user can also purchase the chargeable information by setting the portable device 50 into the down-load device 6 of FIG. 1 as described above. In this case, the down-load device 6 down-loads the information designated by the user to the HDD 54 in the portable device 50 but sets the down-loaded file in the use prohibition state at that time. That is, the information use permission flag is set in the off-state with respect to the file on the HDD 54. In order to use the file down-loaded in the portable device 50, the user must connect the portable device 50 to the recording/reproducing device 10 to shift the file to the recording/reproducing device 10 and carry out the point processing, or must carry out point processing by using the recording/reproducing device 10.

In the case where the file down-loaded in the portable device 50 is shifted to the HDD 15 of the recording/reproducing device 10 so as to be used, the recording/reproducing device 10 regards the file shift as the input of chargeable information in the processing of FIG. 8 and carries out the processing of step S4 and the subsequent steps as described above. Specifically, the recording/reproducing device 10 carries out the temporary accounting processing through the point processing and sets the file shifted to the HDD 15 into the use permission state. After that, the user can freely use the file.

On the other hand, the file down-loaded to the portable device 50 can also be made available in the portable device 50 by carrying out only the point processing at the recording/reproducing device 10, without shifting the file to the HDD 15 of the recording/reproducing device 10. The processing operation therefor of the CPU 11 of the recording/reproducing device 10 will now be described with reference to the flowchart of FIG. 10.

Figure 10:
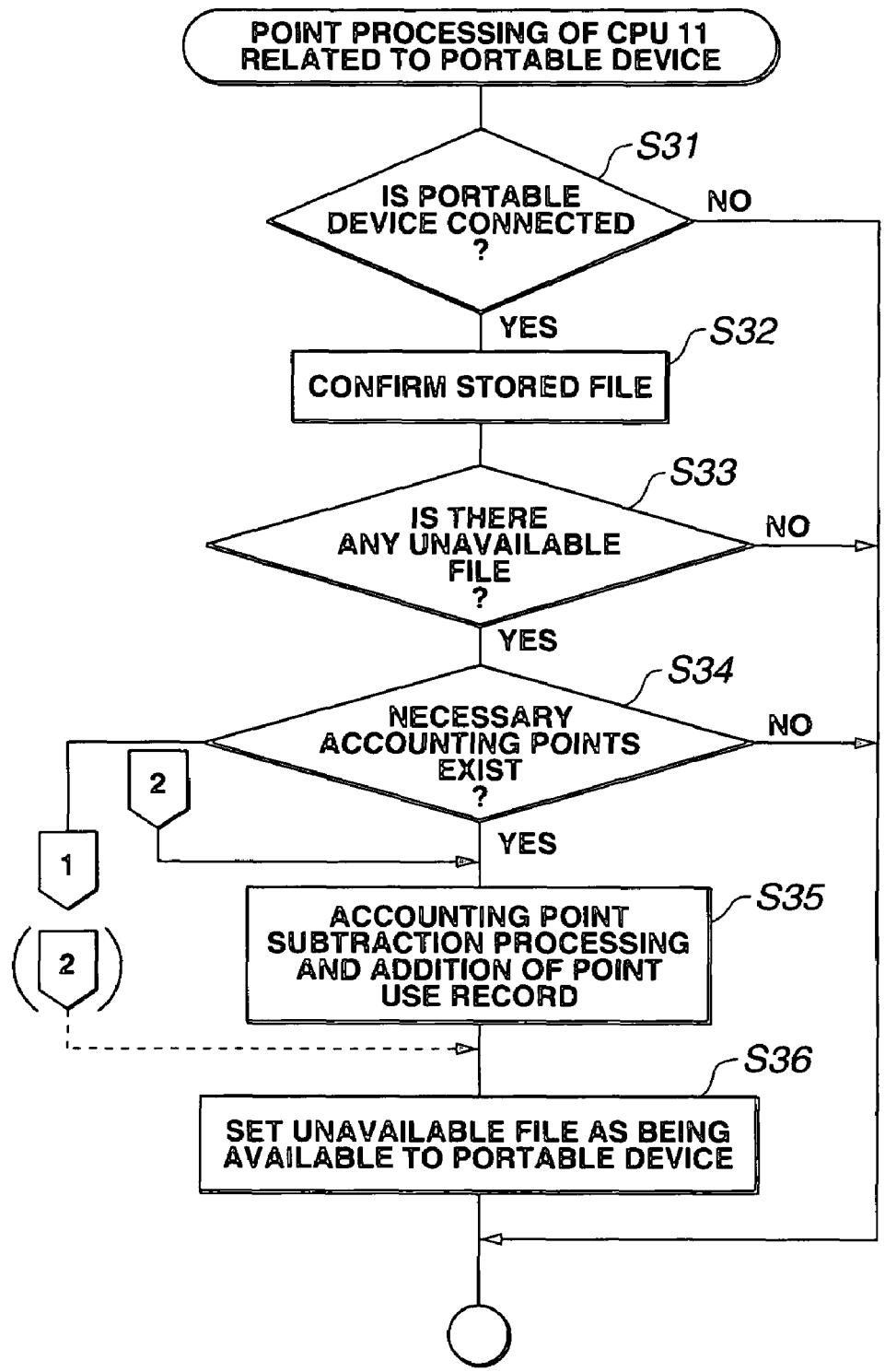
FIG. 10 is a flowchart illustrating specific operation of the CPU when the portable device is connected in the first accounting processing.

At step S31 of FIG. 10, the CPU 11 monitors the connection with the portable device 50. When the connection with the portable device 50 is detected, the CPU 11 advances to step S32 and confirms the file stored on the HDD 54 of the portable device 50. At step S33, the CPU 11 discriminates whether or not there is any file in the use prohibition state at that time. The case where there is a file in the use prohibition state is the case where there is a file of chargeable information which is downloaded from the down-load device 6 by using the portable device 50 and for which the accounting processing has not been carried out yet.

Thus, at step S34, the CPU 11 confirms the number of points of the point memory 45 and discriminates whether or not the number of points equivalent to the fee for the file in the use prohibition state is left as the number of points PT. If the number of points PT is left, the CPU 11 at step S35 subtracts the number of points PT and additionally stores the point use record R(x).

Subsequently, at step S36, the CPU 11 regards that the fee has been paid for the file in the use prohibition state stored on the HDD 54 of the portable device 50, and sets the information use permission flag in the on-state, that is, the use permission state. Specifically, the CPU 11 sets the information use permission flag in the on-state by directly accessing the HDD 54 or through the CPU 51. Thus, the user can use the chargeable information down-loaded to the portable device 50.

If the number of points is insufficient at step S34, the CPU 11 carries out the processing of FIG. 9 similarly to the case of step S6 of FIG. 8.

As the processing of FIGS. 8 to 11 is thus carried out, the user need not carry out the operation for the accounting processing with respect to the purchase of the chargeable information and therefore needs to carry out little troublesome operation. For example, the processing with a prepaid card or the like is not necessary. Also, a card reader and other equipments and operators necessary for the accounting processing are not required, thus enabling simplification of the structure of the recording/reproducing device 10. Moreover, since the actual accounting processing using the communication with the distribution/accounting center 1 is carried out periodically and automatically, the user will not experience any trouble in this regard.

Since the accounting processing through the communication with the distribution/accounting center 1 is not carried out every time the information is inputted, the user need not wait for the accounting processing and can immediately use the obtained information. In the case where the number of points is insufficient, the accounting processing and initialization of the number of points through the communication with the distribution/accounting center 1 are provisionally carried out. Therefore, even in the case where the number of points is insufficient, it is possible to avoid such a situation that the user cannot use the obtained information.

In addition, information can be purchased by using the portable device 50 and the accounting can be carried out by the point processing using the recording/reproducing device 10. Therefore, diversification of the means for obtaining information can be realized and the accounting processing can be smoothly carried out.

While various modifications of the processing can be considered, specific examples as modifications will be described.

In the above-described example, the number of points PT in the point memory 45 is initially set at the specified initial value, and the number of points PT is restored to the initial value at steps S14 and S26. However, the initial value may be not only a fixed value but also may be set by the user. For example, for a user who wants to purchase a large volume of information, it is preferred to set a large number of points as an initial value so as to best avoid the insufficiency of points at steps S6 and S34. That is, in the case of the insufficient of points, the user must wait for the communication and accounting processing time to carry out the provisional accounting processing through communication with the distribution/accounting center 1, and some users want to avoid such a situation as much as possible. Therefore, if the initial value of the number of points can be selected by the user, the accounting processing preferred by each user can be realized. In the case where the initial value can be thus changed, the CPU 11 needs to transmit the current number of points and the initial value in carrying out the accounting processing through communication with the distribution/accounting center 1, so that the distribution/accounting center 1 determines the number of points to be used.

Regardless of whether the initial value is fixed or can be changed, the current number of points and the number of points to be used may be stored in the point memory 45 so as to transmit the number of point to be used to the distribution/accounting center 1.

In the above-described example, the point use record is stored in the point memory 45. However, it is also possible not to store the point use record. For example, if the distribution/accounting center 1 simply collects from the user the fee corresponding to the information purchase, the accounting amount can be determined only from the point value and therefore the point use record is not necessary. That is, in the case where the distribution/accounting center 1 need not carry out distribution of the fee to another organization or the right holder, or in the case where the fee is uniformly and fairly distributed to the copyright holder and the like, the processing corresponding to the point use record, that is, the processing for discriminating the information purchased by the user, is not necessary.

Since the point use record has the meaning of information purchase record to the user, the point use record may be so constituted that it is not cleared on completion of the accounting processing at the distribution/accounting center 1 and the entire point record information may be cumulatively stored on the HDD or the like. In this manner, the user can confirm the past information purchase state by causing the CPU 11 to display the record in a list.

In the above-described example, when the points become insufficient, the accounting processing through communication with the distribution/accounting center 1 is provisionally carried out. However, it is also possible to save the file in the use prohibition state when the points are insufficient, without carrying out such provisional processing. Specifically, when the number of points is initialized after the subsequent periodical processing (steps S9 to S14), the number of points is subtracted to make the file available. Alternatively, when the points are insufficient, it may be considered to delete the stored file or to confirm the number of points before the storage to the HDD 15 and prohibit the recording operation if the points are insufficient.

In the above-described example, in order to carry out the accounting processing through periodical or provisional communication with the distribution/accounting center 1, it is assumed that the recording/reproducing device 10 is physically connected to the distribution/accounting center 1 via the communication channel 3. For example, in the state where the user has detached the connection cord of the communication channel 3 from the recording/reproducing device 10 for a certain reason, the accounting processing at the distribution/accounting center 1 cannot be executed. Since the accounting processing through communication with the distribution/accounting center 1 has the meaning of settlement with respect to the provisional accounting through the point processing, the inability to communicate means that appropriate accounting cannot be carried out. It may also lead to unauthorized use such that the connection cord is detached to prevent communication, that is, to prevent settlement after information for some points are obtained.

Thus, in order to prevent such a situation that the accounting processing cannot be carried out because of the carelessness of the user or to prevent the intentional unauthorized use, it is appropriate to warn the user of the inability to communicate and request connection in the case where the connection cord is detached when the accounting date and time are reached at step S2. In addition, in order to make the connection compulsory to a certain extent, it may be considered to make unavailable all the files in the HDD 15 or the files for which settlement has not been carried out or to cause the recording/reproducing device 10 to stop the entire operating functions until the connection is restored.

In the above-described example, the provisional accounting is carried out by the point subtraction method. However, it may also be considered to carry out the provisional accounting by a point addition method, then periodically communicate with the distribution/accounting center 1 to execute the accounting processing corresponding to the number of points at that time point, and restore the number of points to zero on completion of the accounting processing. The point subtraction method as in the above-described example has such an effect that excessive information purchase by the user can be restrained, that is, the user can be aware of the insufficiency of points when it occurs.

Another specific example of the accounting processing will now be described.

In the above-described example (first accounting processing), the provisional accounting is carried out through the point processing at the recording/reproducing device 10, and the actual accounting processing is carried out by periodically communicating with the distribution/accounting center 1 to carry out settlement corresponding to the quantity of point consumption. On the other hand, in this example (second accounting processing), the actual accounting processing is carried out simply when the user purchases the number of points from the distribution/accounting center 1, and after that, the user can obtain information as long as the number of points is left. That is, advance accounting as in the prepaid card is realized by the point processing.

In this case, it suffices that the number of points PT shown in FIG. 7 is stored in the point memory 45. The point use records R1, R2, . . . may be stored. These records are not used for accounting but enable the user to confirm the information purchase record. The accounting processing in the recording/reproducing device 10 is carried out by subtracting the number of points corresponding to the input of chargeable information, similarly to the first accounting processing.

The operation of the CPU 11 for realizing such second accounting processing will be described with reference to the flowcharts of FIGS. 13 and 14 and the processing at the distribution/accounting center 1 will be described with reference to the flowchart of FIG. 15.

Figure 13:
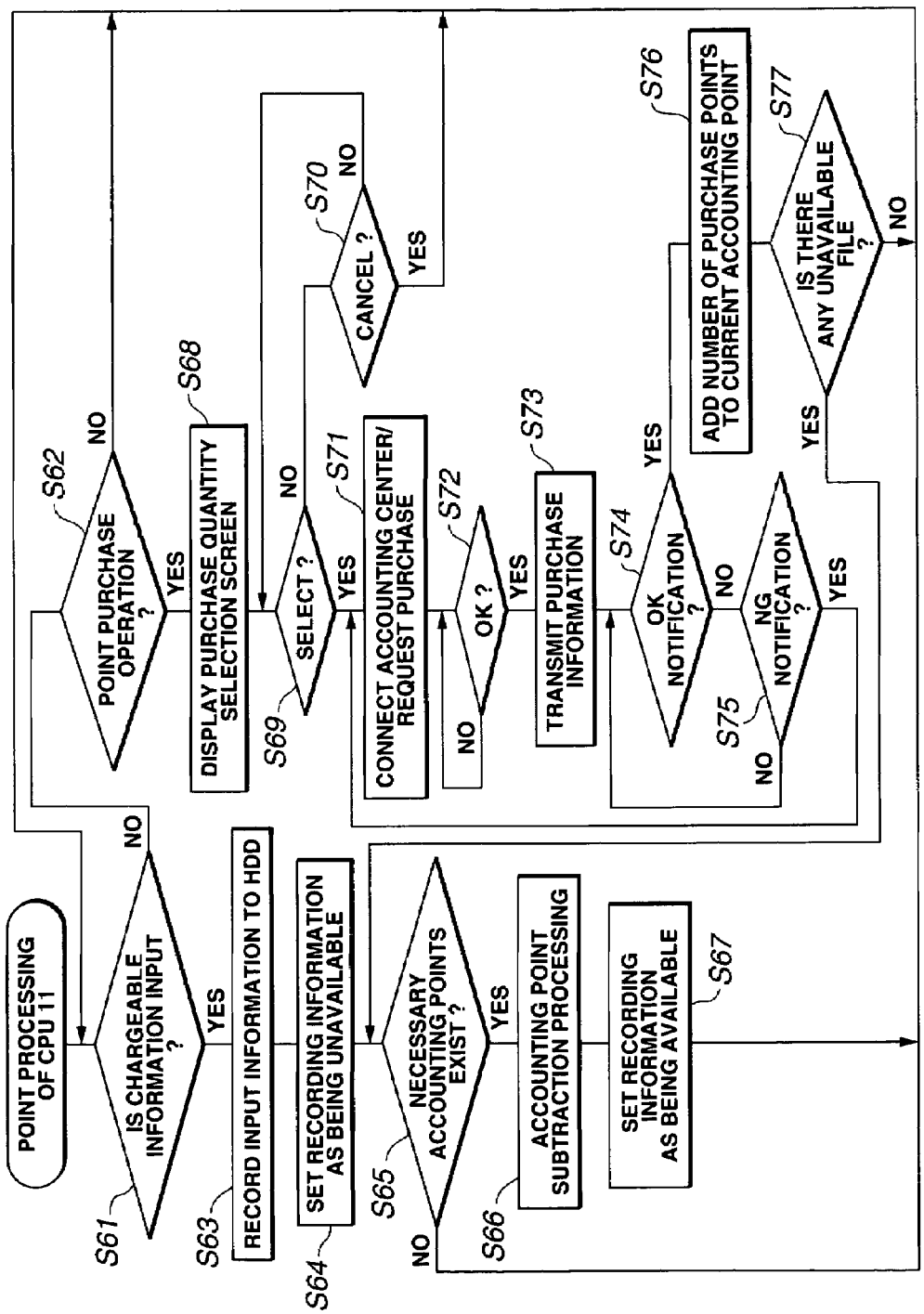
FIG. 13 is a flowchart illustrating specific operation of the CPU in the second accounting processing.

At steps S61 and S62 of FIG. 13, the CPU 11 monitors whether chargeable information is constantly inputted or whether the point purchase operation by the user has been carried out, with respect to the accounting processing.

When the chargeable information is provided from the distribution/accounting center 1 in response to a request for purchase of information by the user, the CPU 11 advances from step S61 to step S63 so as to carry out operation control for recording the input information to the HDD 15. At step S64, the CPU 11 sets the information use permission flag in the off-state, that is, the use prohibition state, with respect to the file stored on the HDD 15.

At step S65, the CPU 11 discriminates whether or not the number of points equivalent to the fee for the information now inputted is left as the number of points PT in the point memory 45.

If the number of points PT is left, the CPU 11 at step S66 subtracts the number of points PT. Specifically, the CPU 11 finds and updates the number of points in accordance with the following equation.

Number of points PT = (number of points PT) − (number of points equivalent to fee for information of this time)

After updating the number of points PT of the point memory 45 at step S66, the CPU 11 at step S67 regards that the fee for the information now stored on the HDD 15 has been paid, and sets the information use permission flag in the on-state, that is, the use permission state, with respect to the information file.

For the user, the information is made available when the temporary accounting, that is, the point subtraction, is carried out with respect to the distributed information. It means that the user can immediately use the information on receiving the distribution of the information, without any latency time for communication with the distribution/accounting center 1 for accounting processing.

On the other hand, if it is determined at step S65 that the number of points is insufficient, the CPU 11 ends the processing at that time. That is, the information stored on the HDD 15 remains unavailable.

As described above, the user can carry out the operation to purchase the number of points, if necessary, at an arbitrary time point. As the purchase operation by the user is carried out, the processing of the CPU 11 advances from step S62 to step S68 and an operation image for point purchase as shown in FIG. 12 is first displayed in the display section 24. The user selects the quantity of point purchase from this screen and carries out decision operation. For example, the user carries out operation by touching the screen. When the user carries out cancel operation, the CPU 11 stops the point purchase processing at step S70.

When the user selects the quantity of point purchase from the screen of FIG. 12 and carries out the decision operation, the processing of the CPU 11 proceeds from step S69 to step S71 to connect the communication channel to the distribution/accounting center 1 and send a point purchase request. At step S72, the CPU 11 waits for reception of an OK notification from the distribution/accounting center 1.

Figure 15:
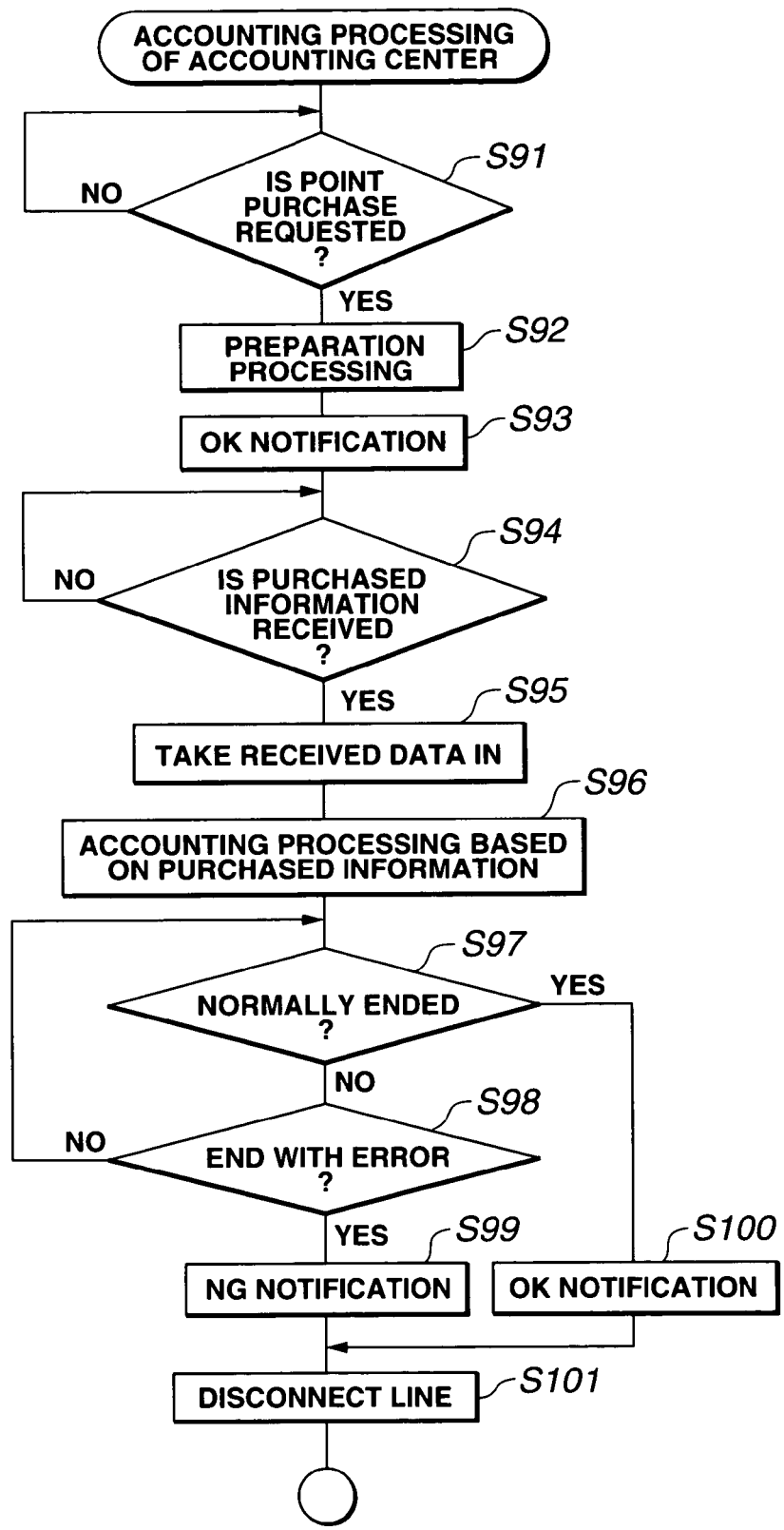
FIG. 15 is a flowchart illustrating specific operation of the distribution/accounting center in the second accounting processing.

In accordance with the channel connection and point purchase request at step S71, the processing shown in FIG. 15 is carried out at the distribution/accounting center 1. The distribution/accounting processing at the distribution/accounting center 1 shown in FIG. 15 is carries out by the controller and the like of the distribution/accounting center 1, similarly to the first accounting processing. Specifically, when a point purchase request is sent from a certain recording/reproducing device 10, the controller of the distribution/accounting center 1 advances from step S91 to step S92 to carry out preparation processing for point sales. For example, the CPU 11 transmits necessary information such as the user ID, equipment ID and password number set by the user together with the point purchase request, and the controller of the distribution/accounting center 1 carries out authentication processing based on the transmitted information as the preparation processing of step S92. That is, the controller discriminates whether or not the point purchase request is an appropriate point purchase request from an appropriate user.

On completion of the authentication and other preparation processing, the controller at step S93 sends an OK notification to the recording/reproducing device 10. At step S94, the controller waits for transmission from the recording/reproducing device 10. Although not shown, the processing ends with an error if inconvenience such as an authentication error occurs at step S93.

When the OK notification is sent from the distribution/accounting center 1, the CPU 11 advances from step S72 to step S73 of FIG. 13 and transmits the quantity of point purchase selected by the user to the distribution/accounting center 1. At step S74 and S75, the CPU 11 waits for an OK notification or NG notification from the distribution/accounting center 1.

On the side of the distribution/accounting center 1, when the quantity of point purchase is transmitted from the recording/reproducing device 10, the controller advances from step S94 to step S95 of FIG. 15 and takes the received data. At step S96, the controller carries out accounting processing based on the quantity of point purchase received from the recording/reproducing device 10. Specifically, the controller prepares data for drawing from the bank account of the user in accordance with the quantity of point purchase.

When such accounting processing normally ends, the processing at the distribution/accounting center 1 proceeds from step S97 to step S100 and the controller sends an OK notification to the recording/reproducing device 10.

Meanwhile, if an accounting error occurs for a certain reason, the processing proceeds from step S98 to step S99 and the controller sends an NG notification to the recording/reproducing device 10. At step S101, the controller disconnects the line with the recording/reproducing device 10.

When an OK notification is sent from the distribution/accounting center 1, the CPU 11 of the recording/reproducing device 10 determines that the accounting processing for point sales by the distribution/accounting center 1 ends properly, and proceeds from step S74 to step S76 to add the number of purchased points, that is, the quantity of points selected by the user for purchase, to the number of points PT at that time.

If an NG notification is sent from the distribution/accounting center 1, the CPU 11 returns from step S75 to step S71 to carry out the communication processing again. If an accounting error occurs at the distribution/accounting center 1, the CPU 11 is to carry out such retrial. Therefore, in such case, the CPU 11 may carry out the processing from step S73 with the line kept connected.

After purchasing the points from the distribution/accounting center 1 and supplementing the point memory 45 with the quantity of purchased points at step S76, the CPU 11 proceeds to step S77 to discriminate whether or not there is any file which is made unavailable on the HDD 15. For example, if it is determined at step S65 that the points are insufficient before the purchase processing, there is a file for which the information use permission flag is left in the use prohibition state. When there is an unavailable file on the HDD 15, the CPU 11 proceeds to step S65 and determines the number of points required for the file. If the number of points not less than the number of necessary points is stored in the point memory 45, the CPU 11 carries out point subtraction processing at step S66 and makes the file available at step S67.

That is, the file which was inputted to the HDD 15 by the user in the past but could not be used or reproduced because of the insufficiency of points is made available as the accounting is carried out when the user purchases the number of points.

If the points are insufficient again when the processing proceeds from step S77 to step S65, the file is still in the use prohibition state. In such case, the user needs to carry out the point purchase processing again. Such case is, for example, the case where expensive information is unavailable because of the insufficiency of points and the user purchased only a small number of points.

Although not shown as the processing, in the case where many pieces of information are recorded on the HDD 15 while the points are insufficient, point subtraction of not more than the number of points PT and setting of the information use permission flag into the use permission state are carried out with respect to files for which the points are sufficient, but files for which the points are insufficient are left in the use prohibition state.

As described in the foregoing first accounting processing, the user can also purchase the chargeable information by setting the portable device 50 into the down-load device 6 of FIG. 1 as described above. In this case, the down-load device 6 sets the file down-loaded onto the HDD 54 in the portable device 50 into the use prohibition state. Similarly to the first accounting processing, in order for the user to use the file, the user must connect the portable device 50 to the recording/reproducing device 10 to shift the file to the recording/reproducing device 10 and carry out the point processing, or must carry out point processing by using the recording/reproducing device 10.

In the case where the file down-loaded in the portable device 50 is shifted to the HDD 15 of the recording/reproducing device 10 so as to be used, the recording/reproducing device 10 regards the file shift as the input of chargeable information in the processing of FIG. 13 and carries out the processing of step S63 and the subsequent steps as described above. Specifically, the recording/reproducing device 10 carries out the accounting processing through the point processing and sets the file shifted to the HDD 15 into the use permission state. After that, the user can freely use the file.

On the other hand, the file down-loaded to the portable device 50 can also be made available in the portable device 50 by carrying out only the point processing at the recording/reproducing device 10, without shifting the file to the HDD 15 of the recording/reproducing device 10. The processing operation therefor of the CPU 11 of the recording/reproducing device 10 will now be described with reference to the flowchart of FIG. 14.

Figure 14:
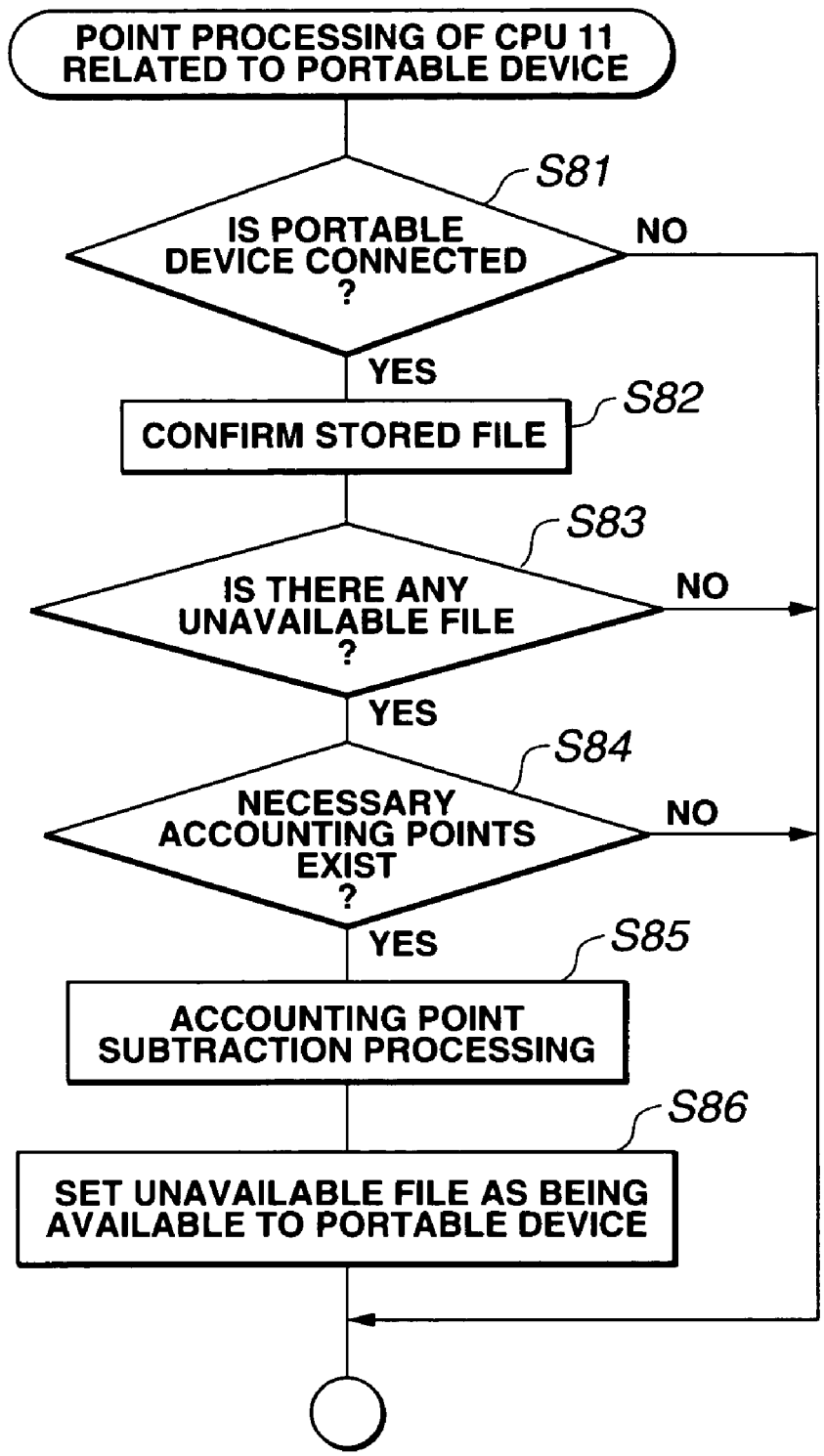
FIG. 14 is a flowchart illustrating specific operation of the CPU when the portable device is connected in the second accounting processing.

At step S81 of FIG. 14, the CPU 11 monitors the connection with the portable device 50. When the connection with the portable device 50 is detected, the CPU 11 advances to step S82 and confirms the file stored on the HDD 54 of the portable device 50. At step S83, the CPU 11 discriminates whether or not there is any file in the use prohibition state at that time. The case where there is a file in the use prohibition state is the case where there is a file of chargeable information which is down-loaded from the down-load device 6 by using the portable device 50 and for which the accounting processing has not been carried out yet.

Thus, at step S84, the CPU 11 confirms the number of points of the point memory 45 and discriminates whether or not the number of points equivalent to the fee for the file in the use prohibition state isleft as the number of points PT. If the number of points PT is left, the CPU 11 at step S85 subtracts the number of points PT.

Subsequently, at step S86, the CPU 11 regards that the fee has been paid for the file in the use prohibition state stored on the HDD 54 of the portable device 50, and sets the information use permission flag in the on-state, that is, the use permission state. Specifically, the CPU 11 sets the information use permission flag in the on-state by directly accessing the HDD 54 or through the CPU 51. Thus, the user can use the chargeable information down-loaded to the portable device 50.

If the number of points is insufficient at step S34, the file in the portable device 50 is still in the use prohibition state and therefore the user must carry out the point purchase.

As the processing of FIGS. 13 to 15 is thus carried out, the user only needs to carry out the point purchase operation in advance for the purchase of the chargeable information, and it is the operation only on the screen as shown in FIG. 12. Therefore, the user will not experience much trouble. Also, the user can purchase an arbitrary quantity of points at an arbitrary time point.

Thus, though the accounting mode is similar to that of the prepaid card, a card reader and another equipments necessary for the accounting processing are not required. Also, the cost of circulation of cards is not necessary and the user need not go out to a dealer for the purchase. Moreover, in this case, since the user can be aware of the quantity of point purchase, that is, the accounting amount, the user himself/herself can be careful to avoid excessive use.

Similarly to the case of the first accounting processing, since the accounting processing through the communication with the distribution/accounting center 1 is not carried out every time the information is inputted, the user need not wait for the accounting processing and can immediately use the obtained information. In the case where the number of points is insufficient, the user only needs to purchase points after that. Therefore, it is possible to avoid such a situation that the user cannot use the obtained information because of the insufficiency of points.

In addition, the information of the down-load device 6 can be purchased by using the portable device 50 and the accounting can be carried out by the point processing using the recording/reproducing device 10. Therefore, diversification of the means for obtaining information can be realized and the accounting processing can be smoothly carried out.

Various modifications can be considered with respect to the second accounting processing, too.

For example, the operation method and the range of selection of the purchase quantity by the user for point purchase are not limited to the above-described specific example.

If the number of points is reduced to a certain value or less, a warning to urge the user to carry out the point purchase may be issued, or the CPU 11 may communicate with the distribution/accounting center 1 so as to automatically purchase a certain number of points.

In the above-described example, when the points become insufficient, the inputted file is left in the use prohibition state. However, the point purchase processing of a specified quantity may be automatically carried out by displaying a screen to urge the user to carry out the point purchase when the points become insufficient, or by pre-setting by the user. Alternatively, when the points are insufficient, it may be considered to delete the stored file or to confirm the number of points before the storage to the HDD 15 and prohibit the recording operation if the points are insufficient. Also, when the points are insufficient, the user may delete the stored file and carry out control to increase the number of points equivalent to the deleted file. In the above-described example, the entire processing of the point memory 45 is executed by the recording/reproducing device 10. However, the point memory may be provided in the portable device 50 so that the processing of the point memory is executed in the portable device 50 itself.

The present invention is not limited to the above-described examples and various modifications of the structure of the device and equipment and the processing procedures may be considered.

INDUSTRIAL APPLICABILITY

In the present invention, accounting point information is stored into the first memory means of the terminal device and information distributed from the external source is stored into the second memory. When the distributed information is stored into the second memory, the accounting point information stored in the first memory is updated and the attributes of the distributed information are updated. Thus, the inconvenience of carrying out communication with the distribution/accounting center 1 every time information is distributed to the recording/reproducing device 10 can be avoided.

What is claimed is:

1. An accounting system including an accounting center and a terminal device for communicating with the accounting center, comprising:
   a first memory built in the terminal device and configured to store accounting point information;
   a second memory included in the terminal device and configured to store information received from an external source external to the terminal device;
   a first controller included in the terminal device and configured to update the accounting point information stored in the first memory and to update attributes of the received information when the received information is stored in the second memory,
   wherein when the received information is stored into the second memory the first controller reduces the accounting point information stored in the first memory and updates the attributes of the received information from an unavailable state to an available state; and
   a second controller included in the terminal device and configured to transmit the remaining accounting point information stored in the first memory to the accounting center and to set the remaining accounting point information to an initial value based on an accounting processing status received by the terminal device from the accounting center corresponding to the remaining accounting point information, wherein the accounting center performs an accounting process based on the remaining accounting point information transmitted from the terminal device.

2. The accounting system as claimed in claim 1, wherein when the accounting point information stored in the first memory is below a minimum for the first received information stored in the second memory, the controller performs control so that the attributes of the received information are held in the unavailable state.

3. The accounting system as claimed in claim 1, wherein when the accounting point information stored in the first memory is below a minimum for the received information stored in the second memory, the second controller transmits the accounting point information stored in the first memory to the accounting center and sets the accounting point information stored in the first memory at the initial value based on the status of accounting processing corresponding to the accounting point information.

4. The accounting system as claimed in claim 1, further comprising a third controller for making a request for purchasing the accounting point information to the accounting center and updating the accounting point information stored in the first memory based on the accounting processing status corresponding to the accounting point information received from the accounting center.

* * * * *

UNITED STATES PATENT AND TRADEMARK OFFICE
CERTIFICATE OF CORRECTION

| | | |
|---|---|---|
| PATENT NO. | : 7,493,275 B1 | Page 1 of 1 |
| APPLICATION NO. | : 09/600509 | |
| DATED | : February 17, 2009 | |
| INVENTOR(S) | : Fumitake Yodo | |

It is certified that error appears in the above-identified patent and that said Letters Patent is hereby corrected as shown below:

On the Title Page,

Item (*) Notice, please add reference to the Terminal Disclaimer filed.

Signed and Sealed this
Fifteenth Day of March, 2011

David J. Kappos
*Director of the United States Patent and Trademark Office*